US007901488B2

(12) United States Patent
Rochelle et al.

(10) Patent No.: US 7,901,488 B2
(45) Date of Patent: Mar. 8, 2011

(54) REGENERATION OF AN AQUEOUS SOLUTION FROM AN ACID GAS ABSORPTION PROCESS BY MATRIX STRIPPING

(75) Inventors: Gary T. Rochelle, Austin, TX (US); Babatunde A. Oyenekan, Katy, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 499 days.

(21) Appl. No.: 11/865,853

(22) Filed: Oct. 2, 2007

(65) Prior Publication Data
US 2008/0127831 A1   Jun. 5, 2008

Related U.S. Application Data

(60) Provisional application No. 60/849,355, filed on Oct. 4, 2006.

(51) Int. Cl.
*B01D 53/14* (2006.01)
(52) U.S. Cl. ............... 95/161; 95/165; 95/191; 95/207; 95/235; 95/236; 96/234; 423/228; 423/229
(58) Field of Classification Search .................. 95/159, 95/165, 166, 168, 169, 170, 171, 191, 207, 95/230, 236, 235, 245, 246, 247, 263, 264, 95/266; 96/181, 234; 423/220, 228, 229
See application file for complete search history.

(56) References Cited

U.S. PATENT DOCUMENTS

| | | | |
|---|---|---|---|
| 3,607,048 A * | 9/1971 | Karwat | 423/352 |
| 3,962,404 A * | 6/1976 | Giammarco et al. | 423/222 |
| 4,050,909 A * | 9/1977 | Ranke | 95/161 |
| 4,073,863 A * | 2/1978 | Giammarco et al. | 423/222 |
| 4,146,569 A * | 3/1979 | Giammarco et al. | 423/222 |
| 4,248,608 A * | 2/1981 | Giammarco et al. | 95/158 |
| 4,250,150 A * | 2/1981 | Karwat et al. | 423/226 |
| 4,302,220 A * | 11/1981 | Volkamer et al. | 95/166 |
| 4,522,638 A * | 6/1985 | Karwat | 95/166 |
| 4,589,889 A * | 5/1986 | Spencer | 95/174 |
| 5,648,053 A * | 7/1997 | Mimura et al. | 423/210 |
| 7,083,662 B2 * | 8/2006 | Xu et al. | 95/165 |
| 2005/0211092 A1* | 9/2005 | Nielsen et al. | 95/236 |

OTHER PUBLICATIONS

Arronwilas and Veawab, "Cost, energy consumption and performance of CO(2) capture process using MEA-MDEA and DEA-MDEA," presented at the 8th International Conference on Greenhouse Gas Control Technologies, Trondheim, Norway, 2006.

(Continued)

*Primary Examiner* — Duane Smith
*Assistant Examiner* — Thomas McKenzie
(74) *Attorney, Agent, or Firm* — Fulbright & Jaworski L.L.P.

(57) ABSTRACT

Carbon dioxide and other acid gases are removed from gaseous streams using aqueous absorption and stripping processes. By replacing the conventional stripper used to regenerate the aqueous solvent and capture the acid gas with a matrix stripping configuration, less energy is consumed. The matrix stripping configuration uses two or more reboiled strippers at different pressures. The rich feed from the absorption equipment is split among the strippers, and partially regenerated solvent from the highest pressure stripper flows to the middle of sequentially lower pressure strippers in a "matrix" pattern. By selecting certain parameters of the matrix stripping configuration such that the total energy required by the strippers to achieve a desired percentage of acid gas removal from the gaseous stream is minimized, further energy savings can be realized.

23 Claims, 10 Drawing Sheets

OTHER PUBLICATIONS

Arronwilas et al., "Evaluation of split-flow scheme for CO(2) absorption process using mechanistic mass-transfer and hydrodynamic model," presented at the 7$^{th}$ International Conference on Greenhouse Gas Control Technologies, Vancouver, Canada, 2004.

Bullin et al., "How to reduce costs in amine-sweetening units," *Chemical Engineering Progress*, 79:63-67, 1983.

Jassim and Rochelle, "Innovative absorber/stripper configuration for CO(2) capture by aqueous monoethanolamine," *Ind. Eng. Chem. Res.*, 45:2465-2472, 2006.

Leites et al., "The theory and practice of energy saving in the chemical industry: some methods for reducing thermodynamic irreversibility in chemical technology processes," *Energy*, 28:55-97, 2003.

Oyenekan and Rochelle, "Modeling of innovative stripper concepts," presented at the 8$^{th}$ International Post Combustion CO(2) Capture Network Meeting, Austin, Texas, USA, 2005.

Polasek et al., "Alternative flow schemes to reduce capital and operating costs of amine sweetening units," *Energy Processing/Canada*, 74:45-50, 1982.

Rochelle, "Innovative stripper configuration to reduce the energy cost of CO(2) capture," presented at the 2$^{nd}$ Annual Carbon Sequestration Conference, Alexandria, Virginia, 2003.

* cited by examiner

REGENERATION OF AN AQUEOUS SOLUTION FROM AN ACID GAS ABSORPTION PROCESS BY MATRIX STRIPPING

This application claims the benefit of priority to U.S. Provisional Patent Application No. 60/849,355, filed Oct. 4, 2006, which is hereby incorporated by reference in its entirety.

This invention was made with government support under grant number DE-FC26-02NT41440 awarded by the U.S. Department of Energy. The government has certain rights in the invention.

BACKGROUND

I. Field

The present invention relates generally to the removal and capture of acid gases, including carbon dioxide, from flue gas or other gases through aqueous absorption and stripping processes. More particularly, it provides methods for reducing the energy consumption of such absorption and stripping processes.

II. Description of Related Art

A common viewpoint held by a significant segment of the environmental community is that carbon dioxide released into the air plays a major role in global climate change. Thus, global climate change initiatives such as the Kyoto Protocol have identified the curtailment of carbon dioxide releases from fossil fuel combustion and other point sources as a primary means of reducing global climate change. Extensive programs already in place are beginning to demonstrate the economic and technical feasibility of sequestering carbon dioxide by approaches such as injection in underground reservoirs (Bergman et al., 1996) and disposal in the deep ocean (Fujioka et al., 1996).

One method of curtailing carbon dioxide releases in the industrial arena involves removing carbon dioxide from combustion gases and other gases. Carbon dioxide is emitted in large quantities from fuel combustion by mobile and stationary sources. Carbon dioxide capture/sequestration will be most effective if applied to large stationary sources. The largest single sources of carbon dioxide are conventional coal-fired power plants. These sources represent 30 to 40% of the carbon dioxide emissions in the United States. Technology developed for such sources should also be applicable to $CO_2$ capture from gas and oil fired boilers, combined cycle power plants, coal gasification, and hydrogen plants. Absorption/stripping is primarily a tail-end technology and is therefore suitable for both existing and new boilers. Specifically, it can be used with existing coal-fired boilers, especially if they already have scrubbers for $SO_2$-abatement.

The use of absorption and stripping processes with aqueous solvents such as alkanolamines and promoted potassium carbonate is a known, effective technology for the removal and capture of carbon dioxide from flue gas, natural gas, hydrogen, synthesis gas, and other gases. U.S. Pat. Nos. 4,477,419 and 4,152,217, each of which is incorporated herein by reference, describe aspects of this technology. Alkanolamine absorption/stripping is one proven and effective technology for carbon dioxide capture from gas. The first generation of this technology uses aqueous solutions of monoethanolamine (MEA). Advances in this technology have provided other alkanolamine solvents for carbon dioxide treating in various industries. Monoethanolamine (MEA), diethanolamine (DEA), and the hindered amine AMP are used alone in an aqueous solution. Typical solvent blends include a methyldiethanolamine (MDEA) solution promoted by piperazine or other secondary amines. Also, potassium carbonate solvents are commonly promoted by DEA or other reactive amines.

Gas absorption is a process in which soluble components of a gas mixture are dissolved in a liquid. Stripping is essentially the inverse of absorption, as it involves the transfer of volatile components from a liquid mixture into a gas. In a typical carbon dioxide removal process, absorption is used to remove carbon dioxide from a combustion gas, and stripping is subsequently used to regenerate the solvent and capture the carbon dioxide contained in the solvent. Once carbon dioxide is removed from combustion gases and other gases, it can be captured and compressed for use in a number of applications, including sequestration, production of methanol, and tertiary oil recovery.

The conventional method of using absorption/stripping processes to remove carbon dioxide from gaseous streams is described in U.S. Pat. No. 4,384,875, which is incorporated herein by reference. In the absorption stage, the gas to be treated, containing the carbon dioxide to be removed, is placed in contact, in an absorption column, with the chosen absorbent under conditions of pressure and temperature such that the absorbent solution removes virtually all the carbon dioxide. The purified gas emerges at the top of the absorption column and, if necessary, it is then directed towards a scrubber employing sodium hydroxide, in which the last traces of carbon dioxide are removed. At the bottom of the absorption column, the absorbent solution containing carbon dioxide (also called "rich solvent") is drawn off and subjected to a stripping process to free it of the carbon dioxide and regenerate its absorbent properties.

To effect the regeneration of the absorbent solution, the rich solvent drawn off from the bottom of the absorption column is introduced into the upper half of a stripping column, and the rich solvent is maintained at its boiling point under pressure in this column. The heat necessary for maintaining the boiling point is furnished by reboiling the absorbent solution contained in the stripping column. The reboiling process is effectuated by indirect heat exchange between part of the solution to be regenerated located in the lower half of the stripping column and a hot fluid at appropriate temperature, generally saturated water vapor. In the course of regeneration, the carbon dioxide contained in the rich solvent to be regenerated maintained at its boiling point is released and stripped by the vapors of the absorbent solution. Vapor containing the stripped carbon dioxide emerges at the top of the stripping column and is passed through a condenser system which returns to the stripping column the liquid phase resulting from the condensation of the vapors of the absorbent solution which pass out of the stripping column with the gaseous carbon dioxide. At the bottom of the stripping column, the hot regenerated absorbent solution (also called "lean solvent") is drawn off and recycled to the absorption column after having used part of the heat content of the solution to heat, by indirect heat exchange, the rich solvent to be regenerated, before its introduction into the stripping column.

In simple absorption/stripping as it is typically practiced in the field, aqueous rich solvent is regenerated at 100-120° C. in a simple, countercurrent, reboiled stripper operated at a single pressure, which is usually 1-2 atm. The rich solvent feed is preheated by cross-exchange with hot lean solvent product to within 5-30° C. of the stripper bottoms. The overhead vapor is cooled to condense water, which is returned as reflux to the countercurrent stripper. When used for carbon dioxide sequestration and other applications, the product carbon dioxide is compressed to 100-150 atm.

A major challenge facing the implementation of aqueous absorption/stripping on a large scale for $CO_2$ capture is the high capital cost of columns, pumps and exchangers and initial solvent and operating cost (reboiler duty, pump circulation rate, solvent make-up) of the technology. If applied to a coal-fired power plant, this may reduce the power output by 20-40% (Rochelle, 2003). Current efforts to reduce the capital and operating cost include the development of alternative solvents to the industrial state-of-the art, 7 m (30-wt %) MEA, the use of innovative process configurations, flowsheet optimization, and energy integration with other sections of the power plant. Alternative solvents should provide equivalent or greater $CO_2$ absorption rates than MEA, adequate capacity for $CO_2$, and reduced cost of regeneration. The important alternative solvents are promoted $K_2CO_3$ (Cullinane et. al, 2002-05), promoted MEA (Dang; Okoye), promoted tertiary amines (Idem et al.; Aroonwilas et al., 2006; Bishnoi), and mildly hindered amines (Mitsubishi). Fluor has developed an improved MEA process (MEA with some corrosion inhibitors). Mitsubishi Heavy Industries (MHI) and Kansai Electric Power Co. Inc. have developed the solvent KS-1 (Mimura et al.; Yagi et al.). The Research Institute of Innovation Technology for the Earth (RITE) has developed some solvents (Shimizu et al.) and Svendsen and co-workers (Ma'mum et al.; Hoff et al.) have screened other solvents. Amino acid salts have been tested for gas absorption/membrane hybrid applications at TNO, Netherlands (Versteeg et al.; Feron et al.). The potential use of ionic liquids for $CO_2$ capture has also been evaluated (Bates et al.; Dixon et al.).

Some alternative process configurations that have been proposed to reduce capital and operating costs of the $CO_2$ capture process include the use of multiple absorber feeds and split flow for the gas sweetening industry (Bullin et al.; Polasek et al.). The performance and cost structure of the split flow configuration has been evaluated (Aroonwilas et al., 2004, 2006), as have vacuum and multipressure configurations (Oyenekan et al., 2005, 2006) and multipressure stripping with vapor recompression (Jassim et al.). Others have proposed other more complex configurations to reduce energy requirement for $CO_2$ removal (Leites et al.).

In light of the above, it would be advantageous to provide for technology in which carbon dioxide and other acid gases can be removed from combustion gases and other gases by an absorption/stripping process that is significantly more energy efficient than the processes currently practiced.

Any problems or shortcomings enumerated in the foregoing are not intended to be exhaustive but rather are among many that tend to impair the effectiveness of previously known techniques. Other noteworthy problems may also exist; however, those presented above should be sufficient to demonstrate that apparatus and methods appearing in the art have not been altogether satisfactory and that a need exists for the techniques disclosed herein.

SUMMARY

One embodiment of the present invention is a method for removing an acid gas from a gaseous stream using absorption and stripping equipment, comprising: (a) contacting the gaseous stream with a solvent in the absorption equipment such that a rich solvent stream exits the absorption equipment; (b) feeding a portion of the rich solvent stream to each of n strippers having stripping zones, wherein n is a fixed integer greater than 1 and wherein the j-th stripper is operated at a higher pressure than and has one less stripping zone than the (j+1)-th stripper, wherein j is a variable integer greater than or equal to 1 but less than n; (c) supplying heat to the j-th stripper such that a partially regenerated solvent stream exits from each of the stripping zones and is fed to the (j+1)-th stripper at a point below where the portion of the rich solvent stream is fed to the (j+1)-th stripper; and (d) supplying heat to the n-th stripper such that a partially regenerated solvent stream exits from each of the stripping zones and is cross-exchanged with one of the portions of the rich solvent stream that are being fed to the n strippers, wherein an acid gas is removed from the gaseous stream.

In a further embodiment, each partially regenerated solvent stream fed to the (j+1)-th stripper is fed at a point above where any other partially regenerated solvent streams that contain less acid gas are fed to the (j+1)-th stripper. In another embodiment, the partially regenerated solvent stream exiting from each of the stripping zones contains substantially all of the solvent that entered the stripping zone. In still another embodiment, the partially regenerated solvent stream exiting from each of the stripping zones contains less than substantially all of the solvent that entered the stripping zone.

In a further embodiment, one or more of the following parameters are selected such that the total energy required by the strippers to achieve a desired percentage of acid gas removal from the gaseous stream is minimized: (a) the operating pressures of the strippers; (b) the relative sizes of the portions of the rich solvent stream that are fed to the strippers; (c) the temperature differences on the hot side of the cross-exchanges; and (d) the type of solvent.

In another embodiment, the type of solvent is selected from the group consisting of: monoethanolamine, promoted monoethanolamine, promoted potassium carbonate, promoted tertiary amines, and hindered amines. In one another embodiment, the type of solvent selected is methyldiethanolamine promoted by piperazine, while in another embodiment the type of solvent is monoethanolamine promoted by piperazine, while in still another embodiment the type of solvent is monoethanolamine. In still another embodiment, the type of solvent selected is a hindered amine.

In yet another embodiment, the heat for each of the n strippers is supplied by a distinct, unlinked heat source that does not supply heat to any of the other strippers. In a further embodiment, the distinct, unlinked heat sources all provide steam at the same temperature to the n strippers.

In a further embodiment, the number of strippers utilized by the method is two (i.e., n equals 2). In one embodiment, the ratio of the operating pressure of the first stripper to the operating pressure of the second stripper is about 1.1 to about 5, including ratios of 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0. In a further embodiment, the ratio of the operating pressure of the first stripper to the operating pressure of the second stripper is about 1.5 to about 2. In a further embodiment, the operating pressure of the first stripper is about 295 kPa and the operating pressure of the second stripper is about 160 kPa, while in still a further embodiment, the operating pressure of the first stripper is about 45 kPa and the operating pressure of the second stripper is about 30 kPa.

In another embodiment, the size of the portion of the rich solvent stream that is fed to the second stripper is about 10% to about 90%, by mass, of the size of the portion of the rich solvent stream that is fed to the first stripper, including mass percentages of 10%, 11%, 12%, 13%, 14% 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 55%, 60%, 65%, 70%, 75%, 80%, 85%, and 90%. In another embodiment, the size of the portion of the rich solvent stream that is fed to the second stripper is about 25% to about 50%, by mass, of the size of the portion of the rich solvent stream that is fed to the first stripper. In yet another embodiment, the size of the portion of the rich solvent stream that is fed to the second stripper is about 25% to about 30%, by mass, of the size of the portion of the rich solvent stream that is fed to the first stripper. In still a further embodiment, the size of the portion of the rich solvent stream that is fed to the second stripper is about 35% to about 50%, by mass, of the size of the portion of the rich solvent stream that is fed to the first stripper. In yet another embodiment, the number of strippers utilized by the method is three (i.e., n equals 3).

Another embodiment of the present invention is an apparatus for removing an acid gas from a gaseous stream, comprising n strippers having stripping zones, wherein n is a fixed integer greater than 1 and wherein the j-th stripper has one less stripping zone than the (j+1)-th stripper, wherein j is a variable integer greater than or equal to 1 but less than n, and wherein the strippers are configured such that: (a) each of the n strippers is fed a portion of a rich solvent stream; (b) supplying heat to the j-th stripper results in a partially regenerated solvent stream exiting from each of the stripping zones and being fed to the (j+1)-th stripper at a point below where the portion of the rich solvent stream is fed to the (j+1)-th stripper; (c) supplying heat to the n-th stripper results in a partially regenerated solvent stream exiting from each of the stripping zones and being cross-exchanged with one of the portions of the rich solvent stream that are being fed to the n strippers; and (d) the j-th stripper is operated at a higher pressure than the (j+1)-th stripper.

In one embodiment, the strippers are further configured such that each partially regenerated solvent stream fed to the (j+1)-th stripper is fed at a point above where any other partially regenerated solvent streams that contain less acid gas are fed to the (j+1)-th stripper. In a further embodiment, the number of strippers utilized by the apparatus is two (i.e., n equals 2). In still a further embodiment, the number of strippers utilized by the apparatus is three (i.e., n equals 3). In yet another embodiment, the apparatus further comprises a distinct, unlinked heat source for each of the n strippers.

Another embodiment of the present invention is a method for removing an acid gas from a gaseous stream using absorption and stripping equipment, comprising: (a) contacting the gaseous stream with a solvent in the absorption equipment such that a rich solvent stream exits the absorption equipment; (b) feeding a portion of the rich solvent stream to each of n strippers having stripping zones, wherein n is a fixed integer greater than 1 and wherein the j-th stripper is operated at a higher pressure than and has one less stripping zone than the (j+1)-th stripper, wherein j is a variable integer greater than or equal to 1 but less than n; (c) feeding a portion of the rich solvent stream to an additional stripper that is not one of the n strippers, wherein the additional stripper is operated at a lower pressure than and has an identical number of stripping zones as the n-th stripper; (d) supplying heat to the j-th stripper such that a partially regenerated solvent stream exits from each of the stripping zones and is fed to the (j+1)-th stripper at a point below where the portion of the rich solvent stream is fed to the (j+1)-th stripper; (e) supplying heat to the n-th stripper such that a partially regenerated solvent stream exits from each of the stripping zones and, except for the stream exiting from the lowest stripping zone, is fed to the additional stripper at a point below where the portion of the rich solvent stream is fed to the additional stripper; (f) supplying heat to the additional stripper such that a partially regenerated solvent stream exits from each of the stripping zones and, except for the stream exiting from the highest stripping zone, is cross-exchanged with one of the portions of the rich solvent stream that are being fed to the n strippers, except for the portion of the rich solvent stream that is being fed to highest-pressure stripper; and (g) cross-exchanging the partially regenerated solvent stream exiting from the lowest stripping zone of the n-th stripper with the portion of the rich solvent stream that is being fed to highest-pressure stripper and cross-exchanging the partially regenerated solvent stream exiting from the highest stripping zone of the additional stripper with the portion of the rich solvent stream that is being fed to the additional stripper; wherein an acid gas is removed from the gaseous stream.

Other embodiments of the present apparatuses and methods are possible.

BRIEF DESCRIPTION OF THE DRAWINGS

The following drawings illustrate by way of example and not limitation. Identical reference numerals do not necessarily indicate an identical structure. Rather, the same reference numeral may be used to indicate a similar feature or a feature with similar functionality. Not every feature of each embodiment is labeled in every figure in which that embodiment appears, in order to keep the figures clear.

DESCRIPTION OF ILLUSTRATIVE EMBODIMENTS

Figure 1:
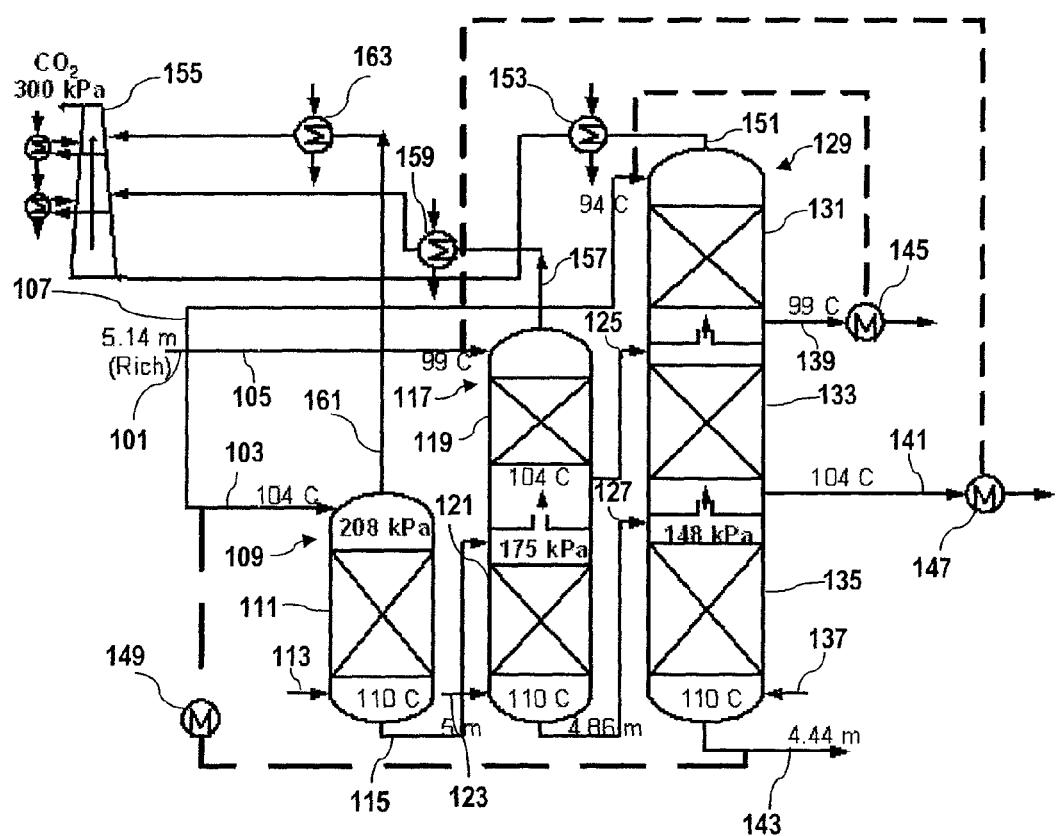
FIG. 1 is a schematic drawing of one embodiment of a matrix stripper configuration, which incorporates three strippers in the matrix configuration.

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a system or method that "comprises," "has," "contains," or "includes" one or more elements possesses those one or more elements, but is not limited to possessing only those one or more elements or steps. Likewise, an element of a system or method that "comprises," "has," "contains," or "includes" one or more features possesses those one or more features, but is not limited to possessing only those one or more features. Furthermore, a structure that is configured in a certain way must be configured in at least that way, but also may be configured in a way or ways that are not specified.

The terms "a" and "an" are defined as one or more than one unless this disclosure explicitly requires otherwise. The terms "substantially" and "about" are defined as at least close to (and includes) a given value or state (preferably within 10% of, more preferably within 1% of, and most preferably within 0.1% of). Metric units may be derived from the English units provided by applying a conversion and rounding to the nearest millimeter.

The following symbols and abbreviations used herein are defined as follows: $\Delta T$=Temperature approach in cross exchanger [K]; $\gamma$=$CO_2$ loading [mol $CO_2$/(mol MEA+mol $K^+$+mol 2 PZ+mol MDEA+mol KS-1)]; Cp=heat capacity of liquid [kJ/mol-K]; $E_{mv}$=Murphree section efficiency defined in terms of partial pressures [-]; $g_{CO2}$=mole rate of $CO_2$ [moles/s]; $\Delta H$=heat of absorption/desorption [kJ/gmol $CO_2$]; $H_{vap}$=heat of vaporization of water [45 kJ/mol]; $K_{CO2}$=equilibrium constant for $CO_2$ [kPa]; L=Liquid rate [moles/s]; ldg=[mol $CO_2$/(mol MEA+mol $K^+$+mol 2 PZ+mol MDEA+mol KS-1)]; $n_{CO2}$=mole of $CO_2$ [moles]; $n_{H2O}$=mole of $H_2O$ [moles]; $P_{CO2}$=partial pressure of $CO_2$ in the bulk gas [kPa]; $P_{CO2}^*$=equilibrium partial pressure of $CO_2$ [kPa]; $P_n$=partial pressures on sections n [kPa]; $P_{n-1}$=partial pressures sections n-1 [kPa]; $P_n^*$=equilibrium partial pressure leaving section n [kPa]; Q=reboiler duty [kJ/gmol $CO_2$]; $Q_{des}$=Heat of desorption of $CO_2$ [kJ/gmol $CO_2$]; $Q_{H2O,gen}$=Heat of steam generation [kJ/gmol $CO_2$]; $Q_{sens}$=Sensible heat required to heat rich solution to reboiler temperature [kJ/gmol $CO_2$]; R=universal gas constant [J/K-mol]; T=temperature [K]; $W_{comp}$=isentropic work of compression [kJ/gmol $CO_2$]; $W_{eq}$=equivalent work [kJ/gmol $CO_2$]; $X^\circ_{amine}$=$CO_2$ free amine mole fraction [mol amine/(mol amine+mol $H_2O$)]; $X_{CO2}$=$CO_2$ liquid mole fraction [mol $CO_2$/(mol amine+mol $CO_2$+mol $H_2O$)].

One objective of the claimed invention is to minimize the heat energy requirements associated with the removal and capture of carbon dioxide and other acid gases from a gaseous stream by aqueous absorption and stripping processes. This objective can be attained by combining aqueous absorption with matrix stripping. Further energy savings can be realized by selecting certain parameters of the matrix stripping configuration such that the total energy required by the strippers to achieve a desired percentage of acid gas removal from the gaseous stream is minimized. These parameters include the operating pressures of the strippers, the relative sizes of the portions of the rich solvent stream that are fed to the strippers, the temperature differences on the hot side of the cross-exchanges, and the type of solvent.

I. Aqueous Absorption

The present apparatuses and methods utilize aspects of the process of aqueous absorption, as described in U.S. Pat. No. 6,139,605, which is incorporated herein by reference. Through this process, carbon dioxide is removed from gaseous streams by contacting the gaseous stream with a liquid absorbent that absorbs the carbon dioxide. As industrial applications expected to benefit from the present invention require the concentration of the carbon dioxide to be reduced to a very low level, the absorbent is generally selected to be one that reacts with carbon dioxide. Examples of absorbent liquids suitable for use in the present invention for the absorption of carbon dioxide include, but are not limited to, promoted potassium carbonate and aqueous solutions of alkanolamines, such as monoethanolamine (MEA), diethanolamine (DEA), and methyl diethanolamine (MDEA).

The absorption step may be carried out by contacting the gaseous stream at a relatively low temperature but at an elevated pressure in an absorption column with a stream of the absorbent liquid, referred to at this stage as "lean solvent," flowing counter-current to the gaseous stream. As described in U.S. Pat. No. 4,384,875, the purified gaseous stream emerges from the top of the absorber, while the absorbent liquid containing the carbon dioxide, referred to at this stage as "rich solvent," emerges from the bottom of the absorber. To capture the carbon dioxide and regenerate the absorbent liquid so it can be recirculated back to the top of the absorber column as lean solvent, the rich solvent is treated with a stripping process.

II. Matrix Stripping

In conventional absorption/stripping, the aqueous solvent is regenerated in a simple, countercurrent, reboiled stripper operated at a single pressure. To carry out the stripping process in certain embodiments of the present invention, a matrix stripping configuration is employed. The matrix stripping configuration uses two or more reboiled strippers operated at different pressures. The rich feed from the absorption process is split among the strippers. Partially regenerated solvent from the highest pressure stripper flows to the middle of sequentially lower pressure strippers in a "matrix" pattern. Because a specific stream of solvent is practically isothermal and because much of the $CO_2$ that can be removed with the process is released at greater pressure, the configuration reduces the energy requirement for stripping by 15 to 30%.

Further energy savings can be realized by selecting certain parameters of the matrix stripping configuration such that the total energy required by the strippers to achieve a desired percentage of acid gas removal from the gaseous stream is minimized. These parameters include the operating pressures of the strippers, the relative sizes of the portions of the rich solvent stream that are fed to the strippers, the temperature differences on the hot side of the cross-exchanges, and the type of solvent.

The matrix stripping configuration will be especially useful in systems such as a power plant, where energy use and integration will be critical, and in plants where the carbon dioxide product must be further compressed for sequestration and other uses. In addition, as environmental concerns magnify, industry may be forced to further explore and adopt various technologies that effectively reduce carbon dioxide emissions in an energy-efficient manner. In such a scenario, the present apparatuses and methods will be highly desirable to an even greater spectrum of industry due to their energy-efficient method of operation.

One embodiment of a matrix stripping configuration is shown in FIG. 1. This embodiment incorporates three strippers in the matrix configuration. The rich solution 101 from the absorber (not shown) is split into three streams 103, 105, and 107. The first rich stream 103 is sent to the first stripper 109 at a higher pressure resulting in a slightly superheated feed. First stripper 109 has a stripping zone 111. Heat is applied in the form of reboiler steam 113. The lean stream 115 from the first stripper 109 is the semi-rich feed to the second stripper 117 (which operates at a lower pressure than the first stripper 109 and has stripping zones 119 and 121). The second rich stream 105 is fed to the top of the second stripper 117. Heat is applied to the second stripper 117 in the form of reboiler steam 123. The second stripper 117 produces a semi-lean stream 125 and a lean stream 127, which are the semi-rich feeds to the third stripper 129 (which operates at a lower pressure than the second stripper 117 and has stripping zones 131, 133, and 135). The third rich stream 107 is fed to the top of the third stripper 129. Heat is applied to the third stripper 129 in the form of reboiler steam 137. The third stripper 129 produces two semi-lean streams 139 and 141 and a lean stream 143. The semi-lean stream 139 exiting highest stripping zone 131 is cross-exchanged with the rich feed 107 to the third stripper 129 in cross-exchanger 145, while the semi-lean stream 141 exiting middle stripping zone 133 is cross-exchanged with the rich feed 105 to the second stripper 117 in cross-exchanger 147. The lean stream 143 is cross-exchanged with the rich solution 103 to the first stripper 109 in cross-exchanger 149. The water vapor from the overhead 151 of the third stripper 129 is condensed in condenser 153 and the $CO_2$ is sent to the first stage of the compression train 155. The water vapor from the overhead 157 of the second stripper 117 is condensed in condenser 159 and the $CO_2$ is sent to the second stage of the compression train 155. The water vapor in the overhead 161 from the first stripper 109 is condensed in condenser 163 and the $CO_2$ is sent to the third stage in the compression train 155.

The compression work in this configuration is reduced because some of the $CO_2$ is recovered at a higher pressure, therefore requiring less compression downstream. Even though a triple (three-strippe)r matrix is described in this embodiment, a two-stripper matrix can also be used. A four-stripper (or higher) matrix can also be used with reduced energy requirement but increased complexity.

Figure 2:
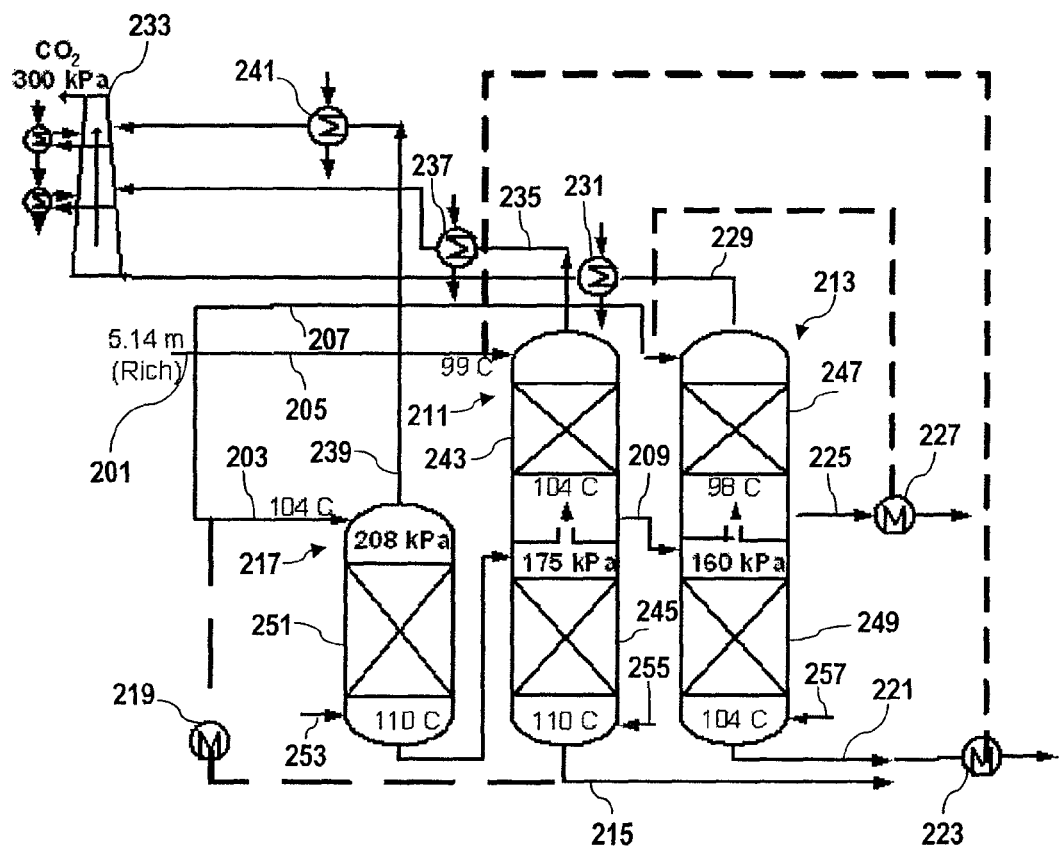
FIG. 2 is a schematic drawing of one embodiment of a matrix stripper configuration, which incorporates two strippers in the matrix configuration with a third stripper to make further use of the isothermal contacting.

Another embodiment of a matrix stripping configuration is shown in FIG. 2. This embodiment incorporates two strippers in the matrix configuration and an additional stripper to make further use of the isothermal contacting. The rich solution 201 is split into three portions 203, 205, and 207, each directed to the top of a stripper at progressively lower pressure. The semi-lean solution 209 from the middle pressure stripper 211 (having stripping zones 243 and 245) is directed to the middle of the low pressure stripper 213 (having stripping zones 247 and 249). Lean solvent 215 from the bottom of the middle stripper 211 is cross-exchanged with rich solution 203 to the high pressure stripper 217 (having stripping zone 251) in cross-exchanger 219. Lean solvent 221 from the bottom of the low pressure stripper 213 is exchanged with rich solvent 205 to the middle pressure stripper 211 in cross-exchanger 223. Semi-lean solvent product 225 is extracted from the low pressure stripper 213 and returned to the middle of the absorber (not shown) through an exchange with the rich solvent 207 to the low pressure stripper 213 in cross-exchanger 227. The water vapor from the overhead 229 of the low pressure stripper 213 is condensed in condenser 231 and the $CO_2$ is sent to the first stage of the compression train 233. The water vapor in the overhead 235 from the middle stripper 211 is condensed in condenser 237 and the $CO_2$ is sent to the second stage in the compression train 233. The water vapor in the overhead 239 from the high pressure stripper 217 is condensed in condenser 241 and the $CO_2$ is sent to the third stage in the compression train 233. Heat is applied to strippers 217, 211, and 213 in the form of reboiler steam 253, 255, and 257, respectively.

III. Examples

The following non-limiting examples are included to demonstrate specific embodiments of the invention. It should be appreciated by those of skill in the art that the techniques disclosed in the examples were discovered by the inventors to function well in the practice of embodiments of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

Example 1

Modeling of Four Alternative Stripper Configurations with Five Different Solvents For this Example, four new stripper configurations (matrix, internal exchange, flashing feed, and multipressure with split feed) were evaluated with five different solvents: 7 m (30 wt %) monoethanolamine (MEA), potassium carbonate promoted by piperazine (PZ), promoted MEA, methyldiethanolamine (MDEA) promoted by PZ and hindered amines. The configurations, solvents, and operating parameters were evaluated to determine which configurations, solvents, and operating parameters result in the greatest energy savings over the baseline configuration and the improved baseline configuration.

A. Analysis of the Baseline Configuration

Previous investigation suggests the optimum generic solvent at 160 kPa (normal pressure) is one with a higher heat of desorption than 7 m (30-wt %) MEA (Oyenekan et al., 2006). Since $PZ/K_2CO_3$ solvents have heats of desorption lower than 7 m MEA, they cannot be employed in a simple stripper with lower energy requirement than 7 m MEA. The $PZ/K_2CO_3$ solvents possess some characteristics that can be exploited in optimized configurations. These include a lower heat of desorption which lends itself to better isothermal system operation and stripping at vacuum. The faster rates of reaction with $CO_2$ permit richer solutions than MEA. Since piperazine is not subject to the same chemistry of thermal degradation as MEA, it may be possible to operate the stripper at a much higher temperature and pressure than MEA. This will reduce the reboiler duty and total equivalent work because of the greater temperature swing giving an effect of a higher heat of desorption solvent.

1. Temperature Approach in the Cross Exchanger and Temperature Change Across the Stripper Previous investigation showed that a 5° C. approach in the cross exchanger provided less total equivalent work for stripping than a 10° C. approach though at the expense of capacity (Oyenekan et al., 2006). At a given reboiler pressure, operating at a 5° C. approach gives a higher temperature at the top of the column relative to a 10° C. approach. The temperature change across the stripper is also smaller and the reboiler duty is reduced. Achieving a 5° C. approach on the hot side of the cross exchanger may require that some of the rich solution from the absorber will have to bypass the cross exchanger because of differences in the heat capacities of the rich solution to the stripper and the lean solution from the stripper.

2. Rich end Pinching

The stripper operation is frequently determined by a rich end pinch because of the larger L/G ratio at the top of the column relative to that at the bottom. With rich end pinches, the driving force at the lean end is excessively large with a loss of available work. There may be configurations that will result in an equally distributed driving force from the rich to the lean end and therefore reduce reboiler duty and total equivalent work.

3. Latent Heat Loss in Stripper Overhead

Typically, the stripper overhead includes 0.5 to 2 moles of water vapor/mole $CO_2$. If this stream is condensed with cooling water, the latent heat of water vapor in the stream is lost. It would be beneficial if this heat can be recovered. The simple and vacuum configurations do not recover this heat but the multipressure system does.

B. Alternative Solvent Types

1. Potassium Carbonate/Piperazine

This class of solvents takes advantage of the fast reaction rates of $CO_2$ with piperazine (PZ) and the low heat of $CO_2$ desorption from potassium carbonate ($K_2CO_3$). The most studied formulation has been 5 m $K^+$/2.5 m PZ. This formulation and 6.4 m $K^+$/1.6 m PZ have been studied at the pilot scale at the University of Texas (Chen et al., 2004, 2006). A third formulation, 4.5 m $K^+$/4.5 m PZ, is proposed because it will provide greater capacity for $CO_2$ absorption.

2. Promoted MEA

The reaction rates of $CO_2$ with MEA can be enhanced by the addition of piperazine (Dang; Okoye). In this work, the $CO_2$ solubility in 7 m MEA/2 m PZ has been represented by the surrogate solvent 11.4 m MEA.

3. Promoted Tertiary Amines

Tertiary amines such as methyldiethanolamine (MDEA) have been used in natural gas processing for decades. MDEA has a high capacity for $CO_2$ absorption and requires low regeneration energy. However, it has slow rates of $CO_2$ absorption. To make MDEA attractive for $CO_2$ capture, it can be promoted by PZ (Bishnoi; U.S. Pat. No. 4,336,233). In this work, the solubility of $CO_2$ in MDEA promoted by PZ is represented by the solubility of $CO_2$ in 4.28M (50-wt %) MDEA.

4. Hindered Amines

This class of solvents has been found to possess adequate rates of reaction with $CO_2$, good $CO_2$ capacities, and low heat of regeneration and has been reported by some authors for $CO_2$ removal (Mitsubishi; Sartori et al., 1983, 1987; U.S. Pat. Nos. 4,405,581, 4,405,585, and 5,904,908). In this work, KS-1 is used as a representative hindered amine solvent. Limited equilibrium data for KS-1 have been extracted from Mitsubishi publications (Mitsubishi; U.S. Pat. No. 5,904, 908).

C. Alternative Configurations

FIGS. 1-4 show four configurations that minimize the energy requirement for stripping. The energy requirement is minimized at the expense of increased capital cost and process complexity. Each of these configurations assumes appropriate cross-exchange of the hot lean stream(s) with the cold rich stream(s) with an approach temperature of 5° C. on the hot side. Each box represents a countercurrent packing section of gas/liquid contacting.

1. Matrix Stripper

Figure 3:
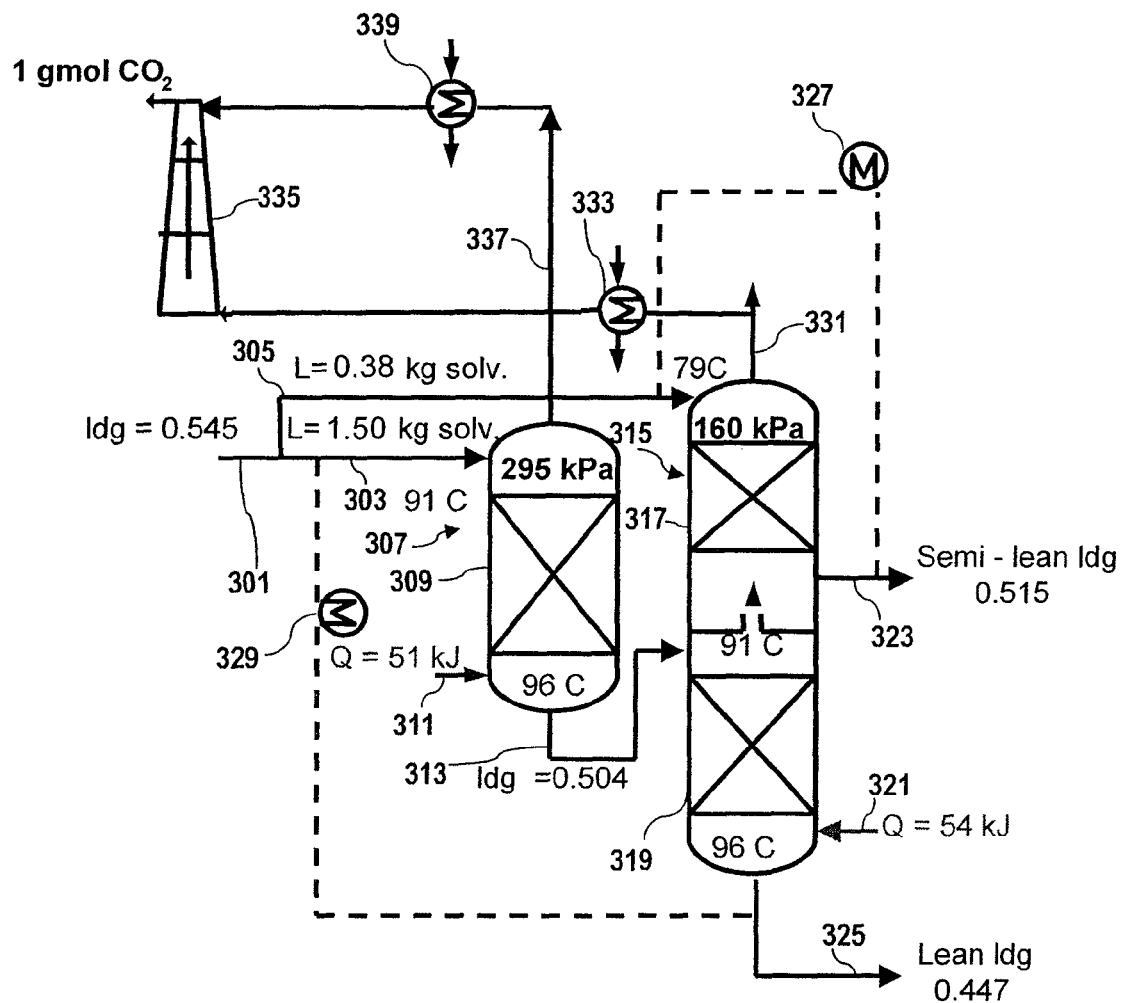
FIG. 3 is a schematic drawing of one embodiment of a matrix stripper configuration, which is a double matrix (295/160) stripper for MEA/PZ, where liquid rate=1.88 kg solvent, rich ldg=0.545 mol $CO_2$/mol TAlk, lean ldg=0.447 mol $CO_2$/mol TAlk, $\Delta T=5°$ C.

In this configuration, one embodiment of which is shown in FIG. 3, the temperature change across the stripper is reduced as in the multipressure configuration but without the inefficiencies associated with mechanical compression. The rich solution 301 from the absorber (not shown) is split into two streams 303 and 305. The first rich stream 303 is sent to the first stripper 307 at a higher pressure resulting in a slightly superheated feed. First stripper 307 has a stripping zone 309. Heat is applied in the form of reboiler steam 311. The lean stream 313 from the first stripper 307 is the semi-rich feed to the second stripper 315 (which operates at a lower pressure and has stripping zones 317 and 319). The other rich stream 305 is fed to the top of the second stripper 315. Heat is applied in the form of reboiler steam 321. The second stripper 315 produces a semi-lean stream 323 and a lean stream 325. The semi-lean stream 323 is cross-exchanged with the rich feed 305 to the second stripper 315 in cross-exchanger 327, while the lean stream 325 is cross-exchanged with the rich solution 303 to the first stripper 307 in cross-exchanger 329. The water vapor from the overhead 331 of the second stripper 315 is condensed in condenser 333 and the $CO_2$ is sent to the first stage of the compression train 335. The water vapor in the overhead 337 from the first stripper 307 is condensed in condenser 339 and the $CO_2$ is sent to the second stage in the compression train 335.

The compression work in this configuration is reduced because some of the $CO_2$ is recovered at a higher pressure, therefore requiring less compression downstream. A double (two-stripper) matrix is described in this embodiment. The pressure of the lower-pressure column 315 is set to 160 kPa for normal pressure operations and 30 kPa for vacuum operations. The pressure of the higher-pressure column 307 and the flow into the flash section are optimized to minimize the total equivalent work of the system. Even though a two-stripper matrix is described in this embodiment, a three-stripper (or more) matrix can also be used with reduced energy requirement but increased complexity.

2. Internal Exchange Stripper

Figure 4:
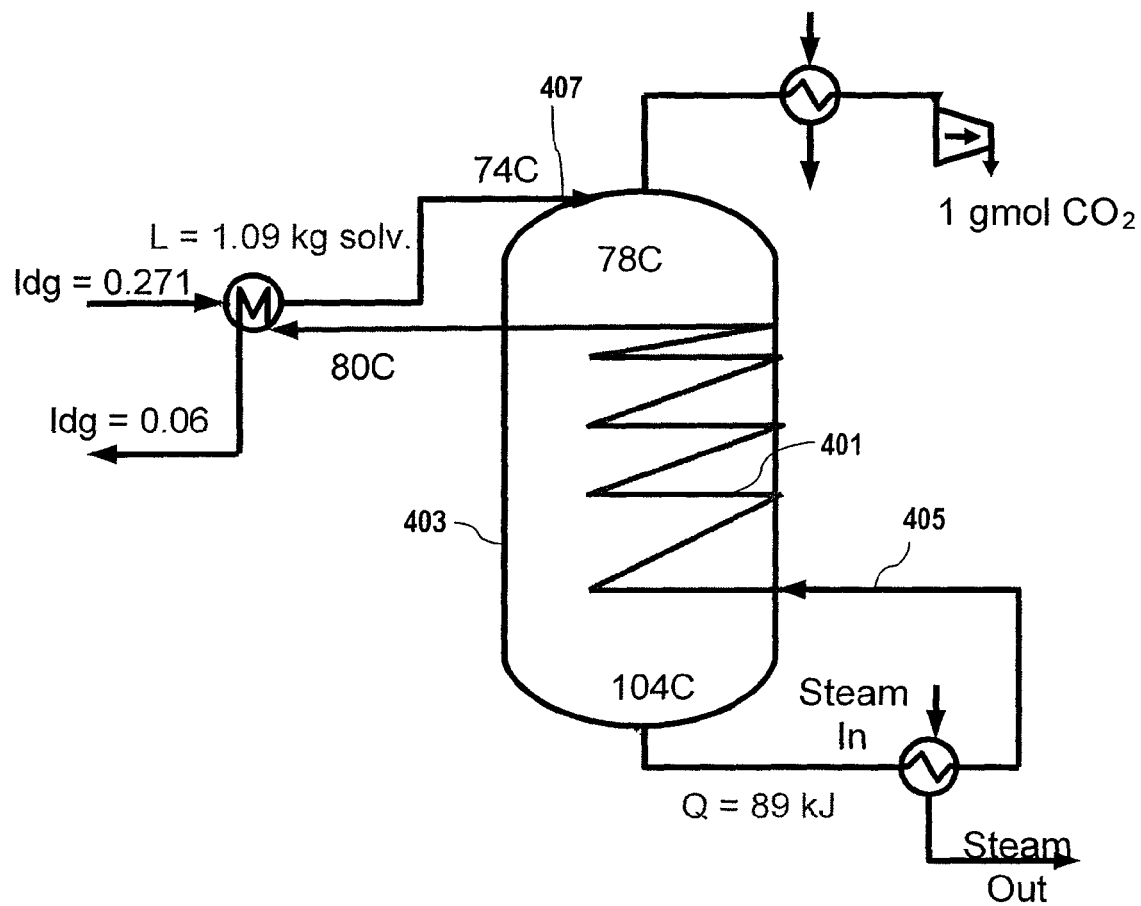
FIG. 4 is a schematic drawing of one embodiment of an internal exchange stripper at 160 kPa for MDEA/PZ, where liquid rate=1.09 kg solvent, rich ldg=0.271 mol $CO_2$/mol TAlk, lean ldg=0.06 mol $CO_2$/mol TAlk, $\Delta T=5°$ C.

This configuration, one embodiment of which is shown in FIG. 4, integrates the stripping process with heat transfer. It serves to approach the theoretical limit of adding and removing material and energy streams along the entire column. This process has been described by Leites et al. It is approximated in a configuration tested by Mitsubishi. The configuration alleviates the temperature drop across the stripper by exchanging the hot lean solution with the solution in the stripper. One implementation would place a continuous heat exchange surface 401 in the stripper 403 so that there is countercurrent heat exchange of the hot lean solution 405 with the solution 407 coming down the stripper. A large overall heat transfer capability of 41.84 kW/K per segment was used. This gave a typical $\Delta T$ of 1.2 K and 3K in the internal exchanger for the vacuum operation and for operation at normal pressure respectively.

3. Multipressure with Split Feed

Figure 5:
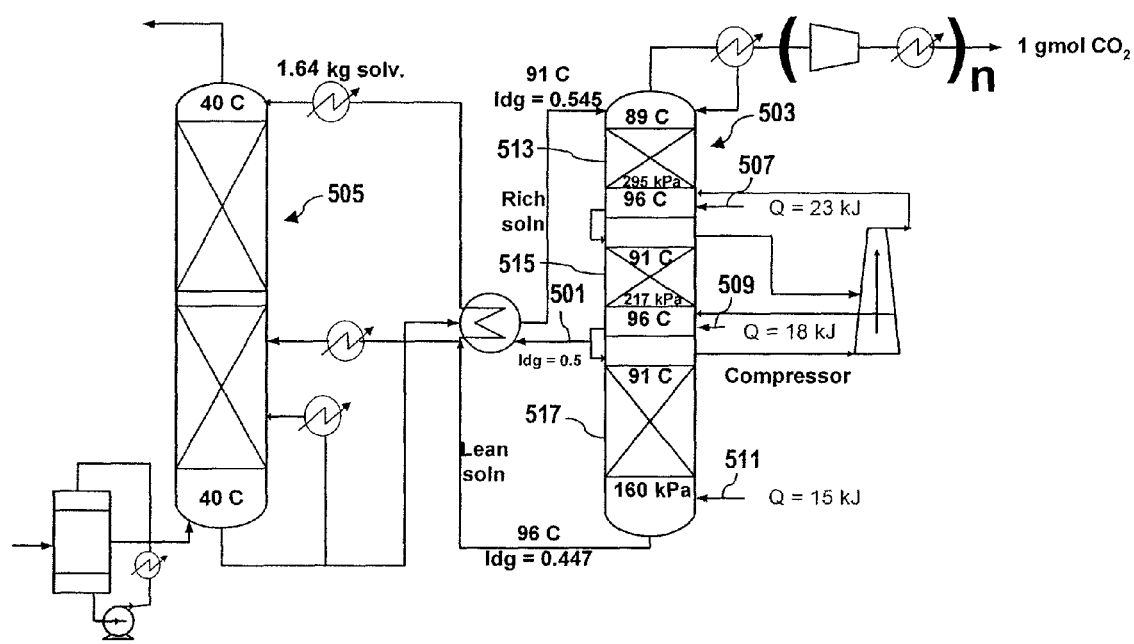
FIG. 5 is a schematic drawing of one embodiment of a multipressure with split feed stripper (295/217/160 kPa) for MEA/PZ, where rich ldg=0.545 mol $CO_2$/mol TAlk, lean ldg=0.447 mol $CO_2$/mol TAlk, $\Delta T=5°$ C.

The multipressure configuration has been described previously (Oyenekan et al., 2006; Jassim et al.). This advanced configuration, one embodiment of which is shown in FIG. 5, takes a 10% split feed 501 from the liquid flowing from the middle to the lowest pressure level in a multipressure stripper 503 and sends this stream to an appropriate point in the absorber 505. The temperatures at the bottom of the stripper pressure sections are equal and heat 507, 509, and 511 is added to each stripper pressure section 513, 515, and 517. This configuration takes advantage of the favorable characteristics of the multipressure configuration and the split flow concepts. The top pressure has been optimized for all solvents and configurations. The middle pressure was taken as the geometric mean.

4. Flashing Feed Stripper

Figure 6:
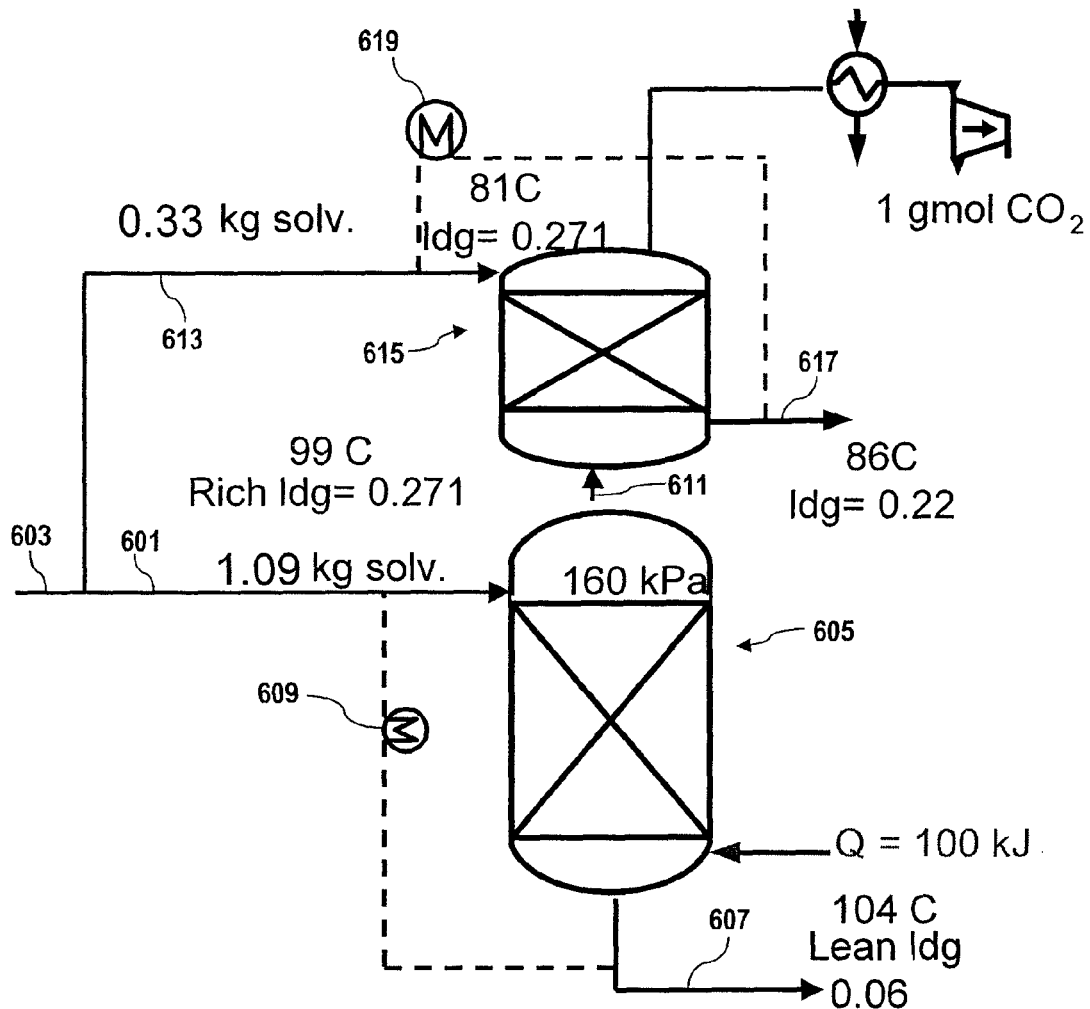
FIG. 6 is a schematic diagram of one embodiment of a flashing feed stripper at 160 kPa for MDEA/PZ, where rich ldg=0.271 mol $CO_2$/mol TAlk, lean ldg=0.06 mol $CO_2$/mol TAlk, $\Delta T=5°$ C.

This configuration, one embodiment of which is shown in FIG. 6, is a special case of the split flow concept described by Leites et al. and Aroonwilas (2004). A fraction 601 of the rich stream 603 is sent to the middle of the stripper 605 where stripping occurs and a lean solution 607 exits at the bottom. The fraction 601 of the rich solution 603 is cross-exchanged with the lean solution 607 exiting the stripper bottom in cross-exchanger 609. The vapor 611 leaving the stripper 605 is then contacted with the balance 613 of the absorber rich flow 603 in a five-staged upper section 615 where the latent heat of water vapor is used to strip the $CO_2$ in the "cold feed" and a semi-lean stream 617 is produced. The semi-lean product 617 is cross-exchanged with the rich solution 613 fed to the upper section 615 in cross-exchanger 619. The reboiler duty remains unchanged and "free stripping" can be achieved in the upper section 615. The split ratio of the rich streams into the middle and upper sections was optimized to minimize equivalent work.

D. Model Development

An equilibrium stripper model for aqueous solvents developed in Aspen Custom Modeler (ACM) was used to evaluate the different process configurations and solvents. A rich end pinch is usually predicted because of the generous amount of contacting assumed in the model. The stripper consisted of a flash region, ten segments with 40% Murphree efficiency assigned to $CO_2$, and a reboiler. The flash region in the column was quantified in terms of actual section performance.

The following modeling assumptions were made:
(a) The sections are well mixed in the liquid and vapor phases.
(b) The reboiler is in vapor/liquid equilibrium.
(c) There is negligible vaporization of the amine.

The $CO_2$ vapor pressure (kPa) under stripper conditions for 7 m MEA, promoted MEA, and different $PZ/K_2CO_3$ blends is represented by the empirical expression in Table 1.

TABLE 1

VLE expression for $PZ/K_2CO_3$, MEA and promoted MEA $$\ln P_{CO2}^* = a + b\gamma + \frac{c}{T} + d\frac{\gamma^2}{T^2} + e\frac{\gamma}{T^2} + f\frac{\gamma}{T}$$

| | 6.4m K+/<br>1.6m PZ | 5m K+/<br>2.5m PZ | 4.5m K+/<br>4.5m PZ | 7m MEA | MEA/PZ<br>(11.4m MEA) |
|---|---|---|---|---|---|
| A | −19.49 | −4.59 | 14.54 | 35.11 | 30.27 |
| B | 24.46 | 34.21 | 30.19 | −45.04 | −38.87 |
| C | 3435.22 | −3834.67 | −7785.78 | −14281 | −11991 |
| D | 1464774 | −1747284 | −763458 | −546277 | 1110073 |
| E | −5514009 | −1712091 | 520318.9 | −3400441 | −4806203 |
| F | 12068.45 | 8186.474 | −2390.31 | 32670.01 | 31355.6 |

The adjustable constants in Table 1 for the $PZ/K_2CO_3$ solutions were obtained by regressing points from the rigorous thermodynamic model by Cullinane (2005). The constants for the MEA solvents were regressed from points obtained from equilibrium flashes in AspenPlus using the Electrolyte Non Random Two Liquid (E-NRTL) model developed by Freguia from data of Jou et al.

The $CO_2$ vapor pressure over 4.28 M MDEA and KS-1, based on the model by Posey et al., is shown in Table 2. For 4.28 M MDEA the constants in Table 2 are taken from Posey et al. For KS-1 the constants, B-D, in the equilibrium constant expression were adjusted to fit available data (Mitsubishi; U.S. Pat. No. 5,904,908). The amine concentration shown in Table 2 for KS-1 is set at 0.1313. The fit of the KS-1 data is shown in Table 3. The $CO_2$ solubility in the different solvents at 40° C. is shown in Table 4.

TABLE 2

VLE expression for promoted MDEA and KS-1

$$P_{CO2}^* = K_{CO2}\, X_{CO2}\left[\frac{\gamma}{1-\gamma}\right]$$

$$\ln K_{CO2} = A + \frac{B}{T} + C\ \mathrm{ldg}\ X°\ \mathrm{amine} + D(\gamma\ X°\ \mathrm{amine})$$

| | MDEA/PZ<br>(4.28 M MDEA)<br>(8.39 m MDEA) | KS-1<br>(8.39 m amine) |
|---|---|---|
| A | 32.45 | 32.45 |
| B | −7440 | −8870 |
| C | 33 | 52 |
| D | −18.5 | −15 |
| $X°_{amine}$ | 0.1313 | 0.1313 |

TABLE 3

Fit of KS-1 VLE data

| T (K) | ldg | KS-1 data<br>(Mitsubishi)<br>$P_{CO2}^*$ (kPa) | Model |
|---|---|---|---|
| | 0.375 | 0.69 | 0.99 |
| | 0.45 | 1.79 | 1.95 |
| 313.15 | 0.5 | 3.10 | 3.03 |
| | 0.575 | 7.58 | 5.91 |
| | 0.05 | 3.79 | 3.31 |
| | 0.0625 | 5.52 | 4.94 |
| 393.15 | 0.21 | 51.71 | 57.33 |
| | 0.325 | 248.21 | 189.11 |

TABLE 4

Equilibrium $CO_2$ (loading) at 40° C. in different solvents

| P (kPa) | 6.4 m K+/<br>1.6 m PZ | 5 m K+/<br>2.5 m PZ | 4.5 m K+/<br>4.5 m PZ | 7 m MEA | MEA/PZ | MDEA/PZ | KS-1 |
|---|---|---|---|---|---|---|---|
| 0.125 | 0.468 | 0.416 | 0.321 | 0.373 | 0.363 | 0.019 | 0.177 |
| 0.5 | 0.532 | 0.467 | 0.383 | 0.442 | 0.428 | 0.046 | 0.303 |
| 0.75 | 0.549 | 0.482 | 0.402 | 0.463 | 0.447 | 0.060 | 0.345 |
| 5 | 0.627 | 0.560 | 0.493 | 0.563 | 0.528 | 0.213 | 0.556 |
| 7.5 | 0.643 | 0.578 | 0.513 | 0.586 | 0.545 | 0.2701 | 0.602 |
| 10 | 0.654 | 0.592 | 0.528 | 0.602 | 0.556 | 0.317 | 0.633 |

The heat of absorption/desorption was calculated by differentiating the equation in Table 1 with respect to 1/T:

$$-\frac{\Delta H}{R} = c + 2d\frac{\gamma^2}{T} + 2e\frac{\gamma}{T} + (f\gamma) \quad \text{(Eq. 1)}$$

The heat of desorption for 4.28 M MDEA and KS-1 was assumed to be constant at 62 and 73 kJ/gmol $CO_2$ respectively. The heat of vaporization of water, partial pressure of water, and heat capacities of solvent (assumed to be water), steam, and $CO_2$ were calculated with equations from the DIPPR database.

The partial pressure of $CO_2$ and water in each section was calculated by:

$$P_n = E_{mv}(P_n^* - P_{n-1}) + P_{n-1} \quad \text{(Eq. 2)}$$

A Murphree efficiency ($E_{mv}$) of 40% and 100% was assigned to $CO_2$ and water. The model assumed that temperature equilibrium is achieved in each section.

The model inputs were the rich loading and liquid rate, the temperature approach on the hot side of the cross exchanger (difference between the temperature of the rich stripper feed and the lean solution leaving the bottom of the stripper), and column pressure. Initial guesses of the lean loading, section temperatures, partial pressures, and loading were provided. The model solves equations for calculating VLE and for material and energy balances. It calculates temperature and composition profiles, reboiler duty, and equivalent work.

The total energy required by the stripper is given as total equivalent work:

$$W_{eq} = 0.75Q\left[\frac{(T_{reb}+10)-313}{(T_{reb}+10)}\right] + W_{comp} \quad \text{(Eq. 3)}$$

$W_{comp}$ constitutes the isentropic work of compression to 330 kPa of the gas exiting the top of the stripper. An efficiency of 75% was assumed for the compressor.

The electricity generation lost by extracting steam from a turbine is the first term on the right hand side of (Eq. 3), while the second is the compressor work. The condensing temperature of the steam is assumed to be 10K higher than the reboiler fluid. The turbine assumes condensing steam at 313K and has been assigned an effective Carnot efficiency of 75%.

E. Results and Discussion

1. Effect of Varying Temperature Approach

Table 5 gives the performance (stripping and compression work to 330 kPa) of the stripper configurations investigated and the capacities of the solvents to achieve 90% $CO_2$ removal. The rich $P_{CO2}^*$ shown in the table are typical rich partial pressures expected for the solvents investigated. In this work, the lean loading for different configurations were optimized to minimize equivalent work. The optimum lean loading was quite flat and was approximately that for 90% removal. The lean loading used in the table corresponds to a 90% partial pressure change in $CO_2$ at 40° C. The baseline configuration is a stripper operating at 160 kPa with a 10° C. approach on the hot side of the cross exchanger. The lean loadings for the baseline were optimized and frequently resulted in overstripping to increase the capacity of the solvents for absorption. With a 5° C. approach on the hot side of the cross exchanger, 3% and 12% energy savings are obtained for the 6.4 m $K^+$/1.6 m PZ and 7 m MEA solvents respectively. This savings in energy is at the expense of a large investment in heat exchange surface.

"Percent split" for each matrix case is defined as the portion (by mass) of the rich solvent stream that is fed to the second stripper divided by of the portion (by mass) of the rich solvent stream that is fed to the first stripper, multiplied by 100%. "Percent split" for each flashing feed case is defined as the portion (by mass) of the rich solvent stream that is fed to the upper section of the stripper divided by of the portion (by mass) of the rich solvent stream that is fed to the middle section of the stripper, multiplied by 100%.

TABLE 5

Predicted performance of different solvents using various stripper configurations (90% removal, $\Delta T = 5°$ C., $P_{final} = 330$ kPa, x = highest pressure in configuration)

| | | Solvent | | | | | | |
|---|---|---|---|---|---|---|---|---|
| | | 6.4 m $K^+$/ 1.6 m PZ | 5 m $K^+$/ 2.5 m PZ | 4.5 m $K^+$/ 4.5 m PZ | 7 m MEA | MEA/PZ | MDEA/PZ | KS-1 |
| $\Delta H_{abs}$ (kJ/gmol $CO_2$) | | 50 | 63 | 67 | 84 | 85 | 62 | 73 |
| Rich $P_{CO2}^*$ (kPa) at 40° C. | | 5 | 5 | 7.5 | 5 | 7.5 | 7.5 | 5 |
| Capacity (mol $CO_2$/kg $H_2O$) | | 0.76 | 0.7 | 1.0 | 0.85 | 1.12 | 1.77 | 2.11 |
| Configuration | Pressure (kPa) | Equivalent Work (kJ/gmol $CO_2$) | | | | | | |
| Baseline | 160 ($\Delta T = 10°$ C.) | 28.1 | 24.8 | 20.9 | 22.3 | 20.0 | 18.3 | 19.1 |
| Improved Baseline | 160 | 27.4 | 22.6 | 18.7 | 19.7 | 17.5 | 17.2 | 17.9 |
| Multipressure | x/160 | 27.0 | 20.5 | 17.6 | 18.2 | 16.2 | 16.3 | 17.0 |
| | x | 180 | 265 | 295 | 280 | 295 | 295 | 295 |
| Matrix | x/160 | 22.2 | 21.7 | 16.8 | 18.0 | 15.7 | 15.1 | 16.1 |
| | x | 250 | 295 | 285 | 265 | 295 | 295 | 295 |
| | percent split | 120 | 40 | 30 | 25 | 25 | 30 | 30 |
| Internal Exchange | 160 | 25.3 | 19.5 | 17.0 | 17.5 | 16.0 | 15.7 | 16.5 |
| Multi P with 10% split feed | | 29.6 | 20.7 | 17.2 | 18.1 | 15.9 | 15.7 | 16.6 |
| Flashing feed | 160 | 23.5 | 20.7 | 17.7 | 18.7 | 16.8 | 16.3 | 17.2 |
| | percent split | 85 | 35 | 25 | 25 | 20 | 30 | 35 |
| Vacuum | 30 | 23.2 | 23.1 | 21.1 | 22.6 | 21.1 | 19.8 | 21.2 |

TABLE 5-continued

Predicted performance of different solvents using various stripper configurations
(90% removal, ΔT = 5° C., $P_{final}$ = 330 kPa, x = highest pressure in configuration)

| | | | | | | | | |
|---|---|---|---|---|---|---|---|---|
| Multipressure | x/30 | 23.7 | 22.5 | 20.3 | 21.6 | 19.9 | 19.2 | 20.7 |
| | x | 30 | 42 | 45 | 45 | 47 | 45 | 42 |
| Matrix | x/30 | 22.5 | 21.8 | 19.6 | 21.2 | 19.4 | 18.2 | 19.8 |
| | x | | 42 | 45 | 45 | 45 | 47 | 45 | 42 |
| | percent split | 90 | 55 | 50 | 50 | 35 | 40 | 70 |
| Internal Exchange | 30 | 22.5 | 21.6 | 19.9 | 21.0 | 19.8 | 19.0 | 20.4 |
| Multi P with 10% split feed | | 31.3 | 22.6 | 20.2 | 21.6 | 19.7 | 19.9 | 20.7 |
| Flashing feed | 30 | 22.7 | 22.5 | 20.6 | 22.1 | 20.6 | 19.5 | 20.8 |
| | percent split | 55 | 35 | 35 | 35 | 30 | 35 | 45 |

2. Effect of Operating Pressure

Operating the stripper under vacuum (30 kPa) with a 5° C. temperature approach in the cross exchanger offers a 14% reduction in equivalent work for 6.4 m $K^+$/1.6 m PZ, 4% and 20% more energy with 5 m $K^+$/2.5 m PZ and promoted MEA (MEA/PZ), respectively. This shows that vacuum operation favors solvents with low heats of absorption while operation at normal pressure favors solvents with high heats of absorption. Solvents with high heats of absorption take advantage of the temperature swing. The relative vapor pressure of $CO_2$ and water changes with temperature. This change is more with solvents with high heats of absorption as shown in Table 6.

TABLE 6

Contributions to reboiler duty-effect of temperature swing for simple strippers

| | 6.4m $K^+$/1.6m PZ | | MEA/PZ | |
|---|---|---|---|---|
| P(kPa) | 30 | 160 | 30 | 160 |
| $\left(\frac{P_{CO2}}{P_{H2O}}\right)$ at rich end | 0.538 | 0.415 | 1.065 | 1.850 |
| $\Delta H_{des}$ (kJ/gmol $CO_2$) | 51 | 34 | 76 | 68 |
| $\left(\frac{n_{H2O}}{n_{CO2}}\right) H_{vap}$ (kJ/gmol $CO_2$) | 81 | 105 | 41 | 24 |
| $\left(\frac{L\ Cp\ \Delta T}{n_{CO2}}\right)$ (kJ/gmol $CO_2$) | 30 | 30 | 24 | 24 |
| Q (kJ/gmol $CO_2$) | 162 | 169 | 141 | 115 |

The reboiler duty required for stripping can be approximated as the sum of three terms: the heat required to desorb the $CO_2$, that required to generate the water vapor at the top of the column, and the sensible heat requirement.

$$Q = Q_{des} + Q_{H2Ogen.} + Q_{sens} \quad \text{(Eq. 4)}$$

$$= \Delta H_{des} + \left(\frac{n_{H2O}}{n_{CO2}} H_{vap}\right) + \frac{L\ Cp\ \Delta T}{n_{CO2}} \quad \text{(Eq. 5)}$$

Table 6 shows that the reboiler duty for 6.4 m $K^+$/1.6 m PZ and MEA/PZ with $\Delta H_{des}$ of 50 and 85 kJ/gmol $CO_2$, respectively. The major difference between the reboiler duties is the relative amount of the heat of desorption of $CO_2$ and the heat required to generate the steam at the top of the stripper. Vacuum operation for a fixed solvent and $CO_2$ removal generates a larger amount of water vapor at the top of the column relative to operation at normal pressure. The overall effect is that vacuum operation favors solvents with low heats of desorption and normal pressure favors solvents with high heats of desorption.

3. Predicted Performance of Alternative Configurations

Table 5 shows that the multipressure configuration with a 160 kPa reboiler is more attractive for the solvents with a high heat of absorption. The performance of the alternative configurations is matrix>internal exchange>multipressure with split feed>flashing feed. The matrix and internal exchange configurations with a 160 kPa reboiler and 5° C. approach with 7 m MEA offer 9% and 11% energy savings, respectively, over the simple stripper operated at 160 kPa with a 5° C. approach. The characteristics of the matrix (265/160 kPa) and vacuum strippers for MEA are shown in Table 7. The matrix stripper recovers about 40% of the $CO_2$ at a higher pressure and does not have the inefficiencies associated with the multipressure stripper. The reboiler duty is also slightly less for the matrix than the vacuum stripper. The characteristics of the vacuum and the vacuum internal exchange strippers are shown in Table 8. The table shows that the major difference between both configurations is the difference in the ratio of the water vapor to $CO_2$ in the overhead stream. The internal exchange stripper has a smaller ratio of water vapor to $CO_2$ ratio. Multipressure with split feed reduces the flow into the bottom section of the stripper and equivalent work. The flashing feed makes use of the latent heat of water vapor in the simple/vacuum configuration to strip some $CO_2$ in the rich stream entering the stripper at the top of the column.

TABLE 7

Performance of matrix (265/160 kPa) stripper and normal pressure (160 kPa) for MEA
(Rich loading = 0.563 mol $CO_2$/molTAlk, lean loading = 0.442 mol $CO_2$/mol TAlk, ΔT = 5° C., $P_{final}$ = 330 kPa)

| | P kPa | Fraction of $CO_2$ removed | Q | $W_{comp}$ kJ/gmol $CO_2$ | Total $W_{eq}$ |
|---|---|---|---|---|---|
| Matrix | 265 | 0.4 | 56 | | |
| | 160 | 0.6 | 58 | 2.1 | 17.9 |
| 160 kPa | 160 | 1 | 123 | 2.9 | 19.7 |

TABLE 8

Characteristics of the vacuum and vacuum internal exchange strippers for 7m MEA
(Rich loading = 0.563 mol $CO_2$/mol TAlk, lean loading = 0.442 mol $CO_2$/mol TAlk, $\Delta T = 5°$ C.)

|  | Vacuum | Vacuum Internal Exchange |
|---|---|---|
| $\left(\dfrac{P_{CO2}}{P_{H2O}}\right)$ at rich end | 0.81 | 1.31 |
| $\Delta H_{des}$ (kJ/gmol $CO_2$) | 73 | 72 |
| $\left(\dfrac{n_{H2O}}{n_{CO2}}\right) H_{vap}$ (kJ/gmol $CO_2$) | 54 | 34 |
| $\left(\dfrac{L\ C_p\ \Delta T}{n_{CO2}}\right)$ (kJ/gmol $CO_2$) | 30 | 30 |
| Q (kJ/gmol $CO_2$) | 157 | 135 |

4. Solvent Performance

Table 5 shows the performance of the different solvent types. The results show that at 160 kPa, the promoted MEA (MEA/PZ) and promoted MDEA (MDEA/PZ) require significantly less equivalent work than 7 m MEA. MEA/PZ offers a 13% and 8% savings over 7 m MEA with the matrix and internal exchange configurations at 160 kPa. The promoted MDEA (MDEA/PZ) was the most attractive solvent under vacuum conditions. The promoted MDEA offers a 14% and 10% savings over 7 m MEA with the matrix and internal exchange configurations at 30 kPa. This shows that at normal pressure solvents with high heats of absorption and reasonable capacities are attractive. Under vacuum conditions, solvents with lower heats of absorption and higher capacities are attractive. Capacity seems to play a more important role in determining energy requirements at vacuum conditions.

5. Effect of Heat of Absorption

From Table 5, solvents with similar capacities but different heats of absorption can be compared. 6.4 m $K^+$/1.6 m PZ and 5 m $K^+$/2.5 m PZ are compared. The results show that at a fixed capacity, solvents with high heats of absorption require less energy for stripping. This is a consequence of the temperature swing. The 5 m $K^+$/2.5 m PZ offers 18% savings over 6.4 m $K^+$/1.6 m PZ at 160 kPa with a 5° C. approach and savings of 3% and 4% with the matrix and internal exchange configurations at vacuum conditions.

6. Effect of Capacity

The capacity of a solvent is defined as the amount of $CO_2$ a solvent can absorb over a given range of loading or partial pressure. This reflects the vapor-liquid equilibrium characteristics of a solvent. A high capacity solvent can absorb or desorb more $CO_2$ than one with a low capacity. In Table 5, the 5 m $K^+$/2.5 m PZ and promoted MDEA (MDEA/PZ) have similar heats of absorption. The main difference between these solvents is in capacity. MDEA/PZ has a greater capacity than 5 m $K^+$/2.5 m PZ. MDEA/PZ solvent provides 30% and 19% energy savings over 5 m $K^+$/2.5 m PZ with the matrix and internal exchange configurations with the reboiler operating at 160 kPa and 17% and 12% savings with these configurations at 30 kPa. The two MEA solvents also have similar heats of absorption. MEA/PZ represented by 11.4 m MEA has a higher capacity than 7 m MEA. MEA/PZ offers 13% energy savings over 7 m MEA with the matrix stripper operated with a 160 kPa reboiler temperature.

7. Insight into Stripper Operation

Figure 7:
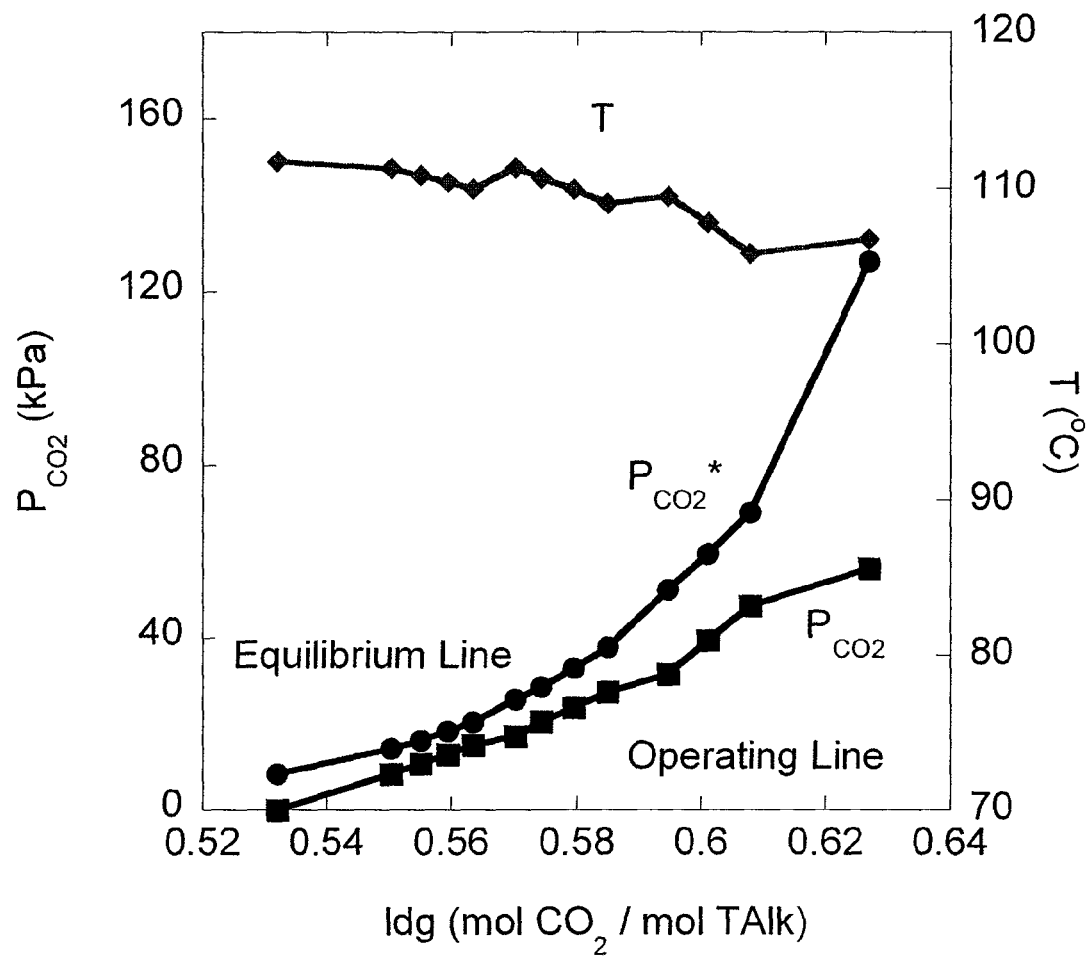
FIG. 7 is a McCabe-Thiele plot for a 160 kPa stripper using 6.4 m $K^+$/1.6 m PZ with 10 segments, where rich ldg=0.627 mol $CO_2$/mol Talk, lean ldg=0.532 mol $CO_2$/mol Talk, $\Delta T=5°$ C.
Figure 8:
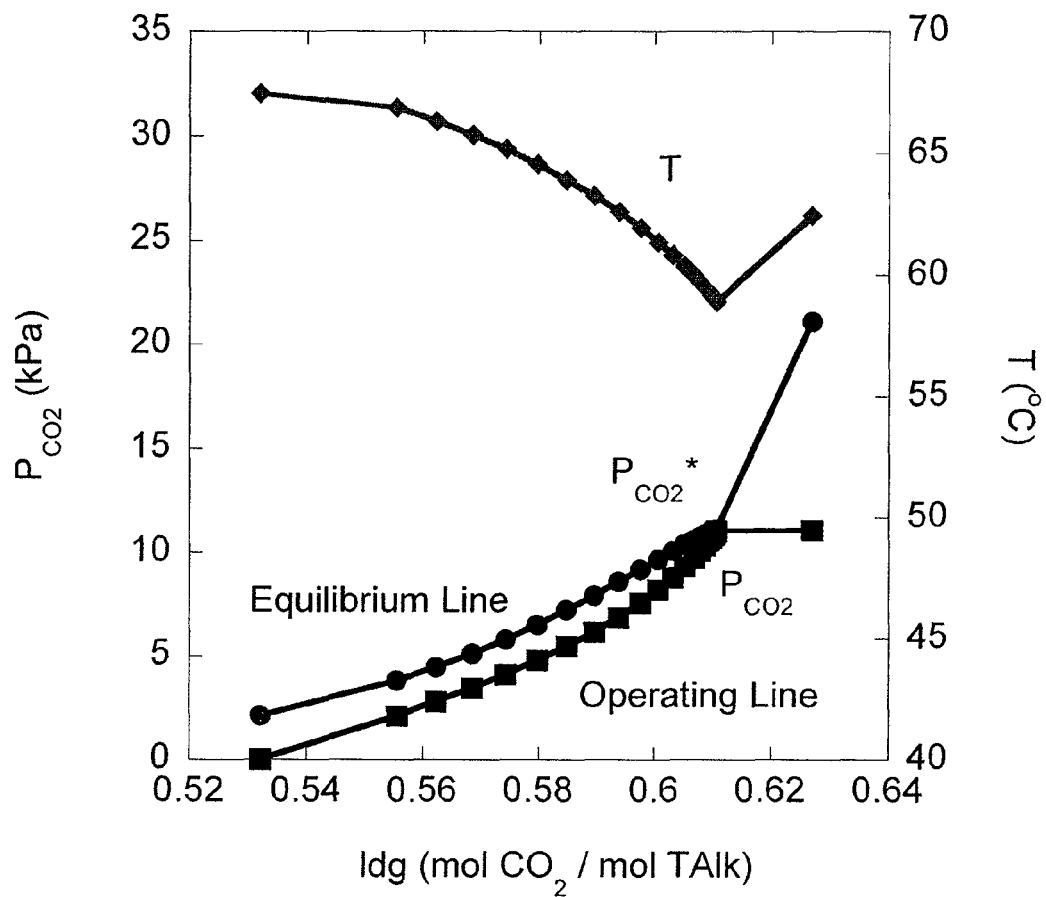
FIG. 8 is a McCabe-Thiele plot for a 30 kPa stripper using 6.4 m $K^+$/1.6 m PZ with 22 segments, where rich ldg=0.627 mol $CO_2$/mol TAlk, lean ldg=0.532 mol $CO_2$/mol TAlk, $\Delta T=5°$ C.

McCabe-Thiele plots provide insight into stripping phenomena. FIG. 7 shows the McCabe-Thiele plot for 6.4 m $K^+$/1.6 m PZ with at 30 kPa comprising of a flash section, ten segments, and an equilibrium reboiler. A lean end pinch is approached. Since this column is not pinched, it could benefit significantly by using more contacting. This is shown in FIG. 8 where the number of contacting segments is doubled. Flashing of the rich solution occurs at the top of the column. A rich end pinch is observed. The total equivalent work to generate $CO_2$ at 330 kPa decreases from 23.7 kJ/gmol $CO_2$ with ten segments to 23.2 kJ/gmol $CO_2$ (a 2% reduction) when the number of segments is doubled. Increasing the number of segments implies increased capital cost.

Figure 9:
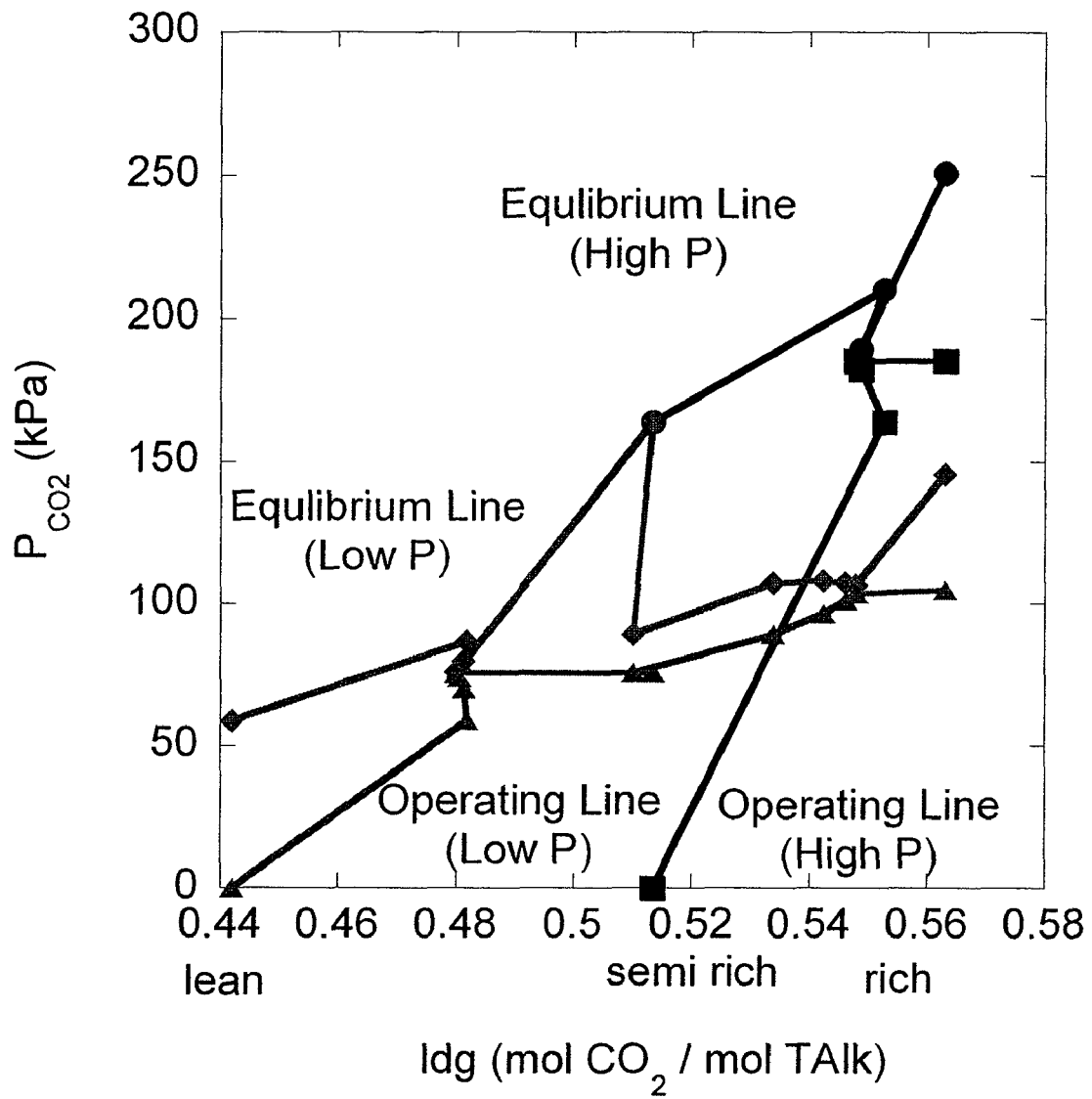
FIG. 9 is a McCabe-Thiele plot for one embodiment of a matrix (265/160 kPa) stripper using 7 m MEA, where rich ldg=0.563 mol $CO_2$/mol TAlk, lean ldg=0.442 mol $CO_2$/mol TAlk, $\Delta T=5°$ C.

The McCabe-Thiele plot for 7 m MEA with the matrix (265/160 kPa) configuration is shown in FIG. 9. It is observed that the high and low pressure columns are highly pinched. A significant amount of $CO_2$ desorption occurs due to flashing and under boiling conditions in the reboiler. The rich, semi-rich, and lean loadings are 0.563, 0.513 and 0.447 mol $CO_2$/mol TAlk. This implies that a significant amount of desorption occurs in the low-pressure column. Some desorption also occur in the 5-stage upper section.

Figure 10:
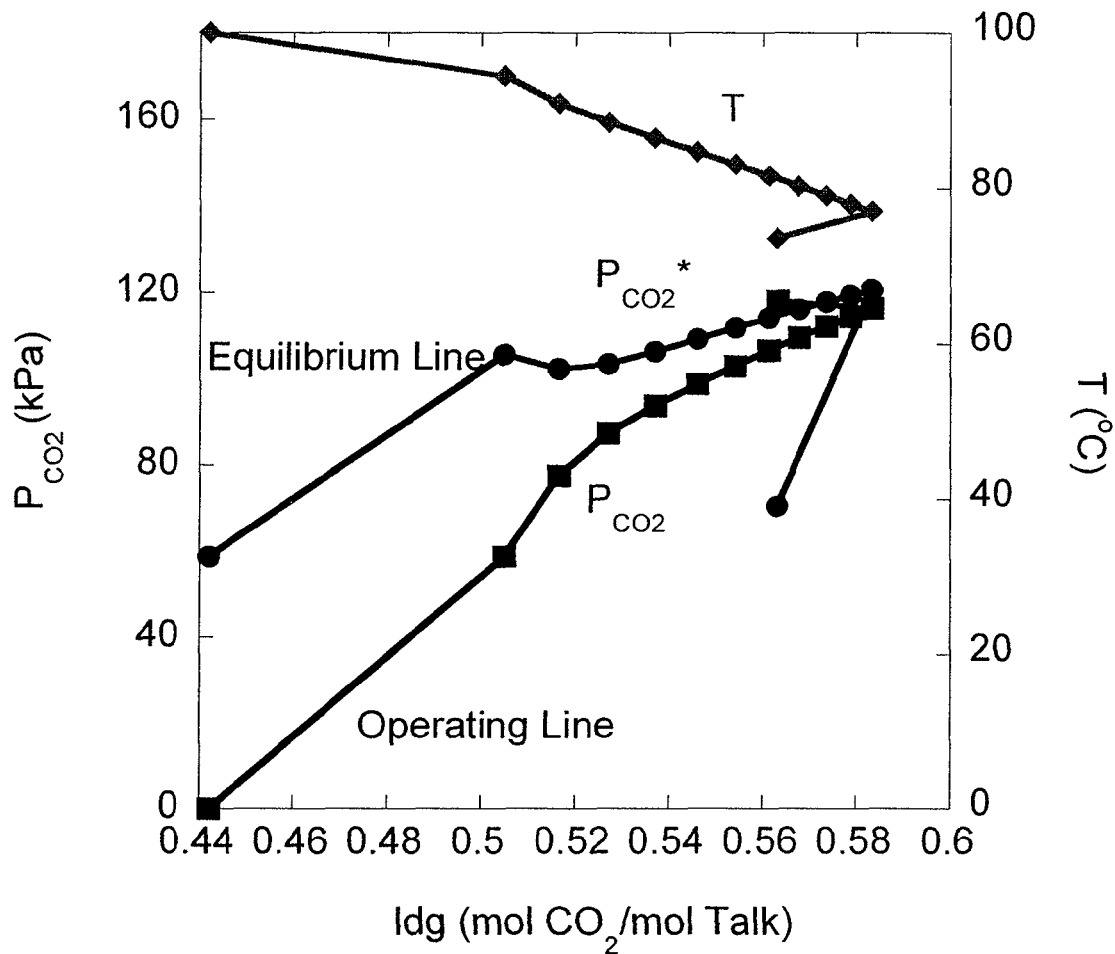
FIG. 10 is a McCabe-Thiele plot for one embodiment of an internal exchange stripper using 7 m MEA at 160 kPa, where rich ldg=0.563 mol $CO_2$/mol TAlk, lean ldg=0.442 mol $CO_2$/mol TAlk, $\Delta T=5°$ C.

FIG. 10 shows the McCabe-Thiele plot for the internal exchange stripper with 7 m MEA at 160 kPa. The feed is subcooled with a loading of 0.563 mol $CO_2$/mol Talk. Some $CO_2$ absorption occurs at the stripper feed increasing the loading to 0.583 mol $CO_2$/mol Talk in the first segment in the stripper before subsequent stripping. The stripper has a rich end pinch. A significant amount of stripping occurs in the reboiler because it is assumed to be an equilibrium stage.

8. Effect on Power Plant Output and Process Improvement

The addition of an absorption/stripping system to a power plant will reduce the plant efficiency by reducing the net power produced from the plant since steam is withdrawn from the plant to drive the reboiler and electrical power is used to operate compressors, blowers, etc. Based on process analysis and economic studies (Fisher et al.), the net power output of a 500 MW power plant is about 150 kJ/gmol $CO_2$ with 90% $CO_2$ capture efficiency. Different separation techniques are compared by separation and compression work in Table 9. The total equivalent work for isothermal separation at 100 kPa and 40° C. and subsequent compression to 10 MPa is 18.1 kJ/gmol $CO_2$. This is the theoretical minimum work for separation and compression to 10 MPa. This constitutes about 12% of the power plant output. If five real compressors with 75% adiabatic efficiency are used, the total equivalent work is 24.6 kJ/gmol $CO_2$ (16% of the power plant output). The best case for the alternative solvents and configurations is shown in the table. The best solvent and process configuration is the matrix (295/160 kPa) with MDEA/PZ. This consumes 26.2 kJ/gmol $CO_2$ (18% of the net output from a 500 MW power plant with 90% $CO_2$ capture). This best case offers 22% energy savings over the current industrial baseline (7 m MEA, 10° C. approach, 160 kPa) and 15% savings over the improved baseline (7 m MEA, 5° C. approach, 160 kPa).

TABLE 9

Energy requirement for separation and compression to 10 MPa

| | Separation Method | | | | |
|---|---|---|---|---|---|
| | $W_{sep}$ | $W_{comp}$ to 330 kPa | $W_{sep}$ + $W_{comp}$ to 330 kPa kJ/gmol $CO_2$ | $W_{comp}$ (330 kPa to 10 MPa) | Total $W_{eq}$ |
| Isothermal Sep. (40° C., 100 kPa), Ideal Comp. | 7.3 | 3.1 | 10.4 | 7.7 | 18.1 |
| Isothermal Sep. (40° C., 100 kPa), 75% adiabatic compression in 5 stages | 7.3 | 5.7 | 13.0 | 11.1 | 24.2 |
| Isothermal Sep. (40° C.), 75% adiabatic compression in 5 stages (Membrane-like) | 11.6 | 5.7 | 17.3 | 11.1 | 28.5 |
| Baseline (7 m MEA, ΔT = 10° C., 160 kPa) | 20.7 | 2.7 | 23.4 | 11.1 | 34.5 |
| Improved Baseline (7 m MEA, ΔT = 5° C., 160 kPa) | 17.0 | 2.7 | 19.7 | 11.1 | 30.8 |
| Matrix 4.5 m $K^+$/4.5 m PZ (285/160) | 16.1 | 0.7 | 16.8 | 11.1 | 27.9 |
| Matrix MEA/PZ (295/160) | 15.2 | 0.5 | 15.7 | 11.1 | 26.8 |
| Matrix MDEA/PZ (295/160) | 14.6 | 0.5 | 15.1 | 11.1 | 26.2 |
| Matrix KS-1 (295/160) | 15.6 | 0.5 | 16.1 | 11.1 | 27.2 |
| Matrix 4.5 m $K^+$/4.5 m PZ (47/30) | 11.1 | 8.5 | 19.6 | 11.1 | 30.7 |
| Matrix MEA/PZ (45/30) | 10.7 | 8.7 | 19.4 | 11.1 | 30.5 |
| Matrix MDEA/PZ (45/30) | 9.5 | 8.7 | 18.2 | 11.1 | 29.3 |
| Matrix KS-1 (45/30) | 11.1 | 8.7 | 19.8 | 11.1 | 30.9 |

F. Conclusions

1. MEA/PZ and MDEA/PZ are solvent alternatives to 7 m MEA that can reduce total equivalent work for the configurations studied.

2. The performance of the alternative configurations is matrix>internal exchange>multipressure with split feed>flashing feed.

3. At a fixed capacity, solvents with high heats of absorption require less energy for stripping. This is a consequence of the temperature swing effect.

4. Less energy is required with high capacity solvents with equivalent heat of absorption.

5. The typical predicted energy requirement for stripping and compression to 10 MPa (30 kJ/gmol $CO_2$) is about 20% of the power output from a 500 MW power plant with 90% $CO_2$ removal.

6. The best solvent and process configuration in this study, matrix (295/160) configuration using MDEA/PZ, offers 22% energy savings over the baseline and 15% savings over the improved baseline with stripping and compression to 10 MPa.

Example 2

Modeling of Matrix Stripping Configuration with Two Different Solvents

An equilibrium stripper model for aqueous solvents developed in Aspen Custom Modeler (ACM) was used to evaluate a matrix stripping configuration with two different solvents and three different operating scenarios for comparison to a baseline scenario.

All of these cases were calculated with a 5° C. approach in the cross-exchanger. The low pressure stripper or only stripper in each case was designed to operate at 160 kPa. "Percent split" for each case is defined as the portion (by mass) of the rich solvent stream that is fed to the second stripper divided by of the portion (by mass) of the rich solvent stream that is fed to the first stripper, multiplied by 100%. The rich solvent feed rate to the high pressure column of the double matrix configuration was defined as the split ratio times the feed to the high pressure column. The pressure ratio of the first column to the second column was also optimized.

The results of the modeling are presented in Table 10, which shows that, as in Table 5, the matrix configuration with an optimized split ratio and pressure ratio requires less equivalent work that the simple stripper base case, 1.1 kJ/gmol less with 5 m$K^+$/2.5 m piperazine, and 1.9 kJ/gmol less with 7 m MEA.

If the rich solution is divided equally between the low and high pressure stripper (100% split) the savings of equivalent work is significantly less, 0.6 with 5 m$K^+$/2.5 m piperazine and even worse with 7 m MEA, which shows a 2 kJ/gmol increase over the simple stripper base case. Therefore, with solvents that have heats of $CO_2$ absorption greater than about 63 kJ/gmol, the rich feed to the second stripper must be 20 to 50% of the feed to the high pressure stripper.

If the pressure of the first stripper is only slightly above that of the second stripper (180 kPa/160 kPa) the energy savings are also reduced, 0.3 for 5 m$K^+$/2.5 m piperazine and 0.7 for 7 m MEA. Therefore it is important that there be a significant ratio of the pressure of the first and second stripper.

TABLE 10

Modeling Results
Separation and compression work to 330 kPa

| Optimized results | Solvent | 5 m K+/2.5 m PZ | 7 m MEA |
|---|---|---|---|
| | Δ Habs (kJ/gmol $CO_2$) | 63 | 84 |
| | Rich $PCO_2$* (kPa) at 40° C. | 5 | 5 |
| | Capacity (mol $CO_2$/kg $H_2O$) | 0.7 | 0.85 |
| | Configuration | | |
| Baseline | | 22.6 | 19.7 |
| Optimized | Equivalent W, kJ/gmol $CO_2$ | 21.7 | 17.8 |

TABLE 10-continued

Modeling Results
Separation and compression work to 330 kPa

| Optimized results | Solvent | 5 m K+/2.5 m PZ | 7 m MEA |
|---|---|---|---|
| Matrix | P of first stripper, kPa | 295 | 265 |
| | percent split | 40 | 25 |
| Matrix w | Equivalent W, kJ/gmol $CO_2$ | 22.0 | 21.7 |
| 100% split | P of first stripper, kPa | 295 | 265 |
| | percent split | 100 | 100 |
| Matrix w | Equivalent W, kJ/gmol $CO_2$ | 21.9 | 19.4 |
| low $P_1/P_2$ | P of first stripper, kPa | 180 | 180 |
| | percent split | 40 | 25 |

It should be understood that the present systems and methods are not intended to be limited to the particular forms disclosed. Rather, they are to cover all modifications, equivalents, and alternatives falling within the scope of the claims.

The claims are not to be interpreted as including means-plus- or step-plus-function limitations, unless such a limitation is explicitly recited in a given claim using the phrase(s) "means for" or "step for," respectively.

REFERENCES

Each of the following references is specifically incorporated herein by reference in its entirety:

U.S. Pat. No. 4,477,419
U.S. Pat. No. 4,152,217
U.S. Pat. No. 6,139,605
U.S. Pat. No. 4,384,875
U.S. Pat. No. 4,553,984
U.S. Pat. No. 4,405,585
U.S. Pat. No. 4,405,581
U.S. Pat. No. 5,904,908
U.S. Pat. No. 4,336,233

Aroonwilas, A. and A. Veawab, "Cost, energy consumption and performance of $CO_2$ capture process using MEA-MDEA and DEA-MDEA," presented at the 8th International Conference on Greenhouse Gas Control Technologies, Trondheim, Norway, 2006.

Aroonwilas, A., "Evaluation of split-flow scheme for $CO_2$ absorption process using mechanistic mass-transfer and hydrodynamic model," presented at the 7th International Conference on Greenhouse Gas Control Technologies, Vancouver, Canada, 2004.

Aroonwilas, A. and A. Veawab, "Cost structure and performance of $CO_2$ capture unit using split-stream cycle," presented at the 8th International Conference on Greenhouse Gas Control Technologies, Trondheim, Norway, 2006.

Bates, E. D., R. D. Mayton, I. Ntai, and J. H. Davis, "$CO_2$ capture by a task-specific ionic liquid," J. Am. Chem. Soc., 2002, 124, (6), 926-927.

Bergman, P. D., E. M. Winter, and Z-Y. Chen, "Disposal of Power Plant $CO_2$ in Depleted Oil and Gas Reservoirs in Texas," presented at the Third International Conference on Carbon Dioxide Removal, Cambridge, Mass., Sep. 9-11, 1996.

Bishnoi, S., "Carbon Dioxide Absorption and solution equilibrium in piperazine activated methyldiethanolamine," Ph.D., University of Texas-Austin, Austin, 2000.

Bullin, J. A., J. C. Polasek, and S. T. Donnelly, "How to reduce costs in amine-sweetening units," Chemical Engineering Progress, 1983, 79, (3), 63-7.

Chen, E., "Pilot Plant for $CO_2$ Capture Using Aqueous piperazine/Potassium Carbonate," EPA Star Graduate Fellowship Conference, 2004.

Chen, E. and G. T. Rochelle, "Pilot plant for $CO_2$ capture with aqueous piperazine/potassium carbonate," presented at the 8th International Conference on Greenhouse Gas Control Technologies, Trondheim, Norway, 2006.

Cullinane, J. T., "Thermodynamics and Kinetics of aqueous piperazine with potassium carbonate for carbon dioxide absorption," Ph.D Dissertation, University of Texas-Austin, Austin, 2005.

Cullinane, J. T. and G. T. Rochelle, "Thermodynamics of Aqueous Potassium Carbonate, piperazine, and $CO_2$ Mixtures," Fluid Phase Equilibrium, 2004, 227, 197-213.

Cullinane, J. T., "Carbon Dioxide absorption in aqueous mixtures of potassium carbonate and piperazine," Masters, University of Texas-Austin, Austin, 2002.

Cullinane, J. T., B. A. Oyenekan, J. Lu, and G. T. Rochelle, "Aqueous piperazine/potassium carbonate for enhanced $CO_2$ capture," presented at the 7th International Conference on Greenhouse Gas Control Technologies, Vancouver, Canada, 2004.

Dang, H, "CO2 absorption rate and solubility in monoethanolamine/piperazine/water," Masters, University of Texas-Austin, Austin, 2000.

Design Institute for Physical Properties In American Institute of Chemical Engineers: 2004 ("DIPPR").

Dixon, J. K.; M. J. Muldoon, J. L. Anderson, J. F. Brennecke, and E. J. Maginn, "Tuning ionic liquids for $CO_2$ gas absorption," presented at AIChE Annual Meeting, Cincinnati, Ohio, USA, 2005.

Feron, P. H. M. and N. ten Asbroek, "New solvents based on amino-acid salts for $CO_2$ capture from flue gases," presented at the 7th International Conference on Greenhouse Gas Control Technologies, Vancouver, Canada, 2004.

Freguia and G. T. Rochelle, "Modeling of $CO_2$ Capture by Aqueous Monoethanolamine," submitted to AIChE J., August 2002.

Freguia, S., "Modeling of $CO_2$ Removal From Flue Gas with Monoethanolamine," Masters, University of Texas-Austin, Austin, 2002.

Fisher, K. S., C. Beitler, C. Rueter, G. T. Rochelle, and M. S. Jassim, "Integrating MEA regeneration with CO2 compression and peaking to reduce $CO_2$ capture costs," Draft Report to The U.S. Department of Energy, 2005.

Fujioka, Y. et al., "Cost Comparison of Various CO2 Ocean Disposal Options," presented at the Third International Conference on Carbon Dioxide Removal, Cambridge, Mass., Sep. 9-11, 1996.

Herzog, H., E. Drake, & E. Adams, "CO2 Capture, Reuse, and Storage Technologies for Mitigating Global Climate Change," final rept, DOE Order No. DE-AF22-96PC01257, 1997.

Hoff, K. A., T. Mejdell, T., O. Juliussen, R. Borresen, K. G. Lauritsen, H. T. Semb, and H. F. Svendsen, "Solvents selection for a post combustion $CO_2$ capture process," presented at the 8th International Conference on Greenhouse Gas Control Technologies, Trondheim, Norway, 2006.

Idem, R., M. Wilson, P. Tontiwachwuthikul, A. Chakma, A. Veawab, A. Aroonwilas, and D. Gelowitz, "Pilot Plant Studies of the $CO_2$ Capture Performance of Aqueous MEA and Mixed MEA/MDEA Solvents at the University of Regina $CO_2$ Capture Technology Development Plant and the Boundary Dam $CO_2$ Capture Demonstration Plant," Ind. Eng Chem. Res., 2006, 45, 2414-2420.

Jassim, M. S, and G. T. Rochelle, "Innovative Absorber/Stripper Configurations for $CO_2$ Capture by Aqueous Monoethanolamine" Ind. Eng. Chem. Res., 2006, 45, (8), 2465-72.

Jou, F.-Y., A. E. Mather, and F. D. Otto, "The Solubility of CO$_2$ in a 30 Mass Percent Monoethanolamine Solution," *The Canadian Journal of Chemical Engineering*, 1995, 73, (1), 140-147.

Kohl and Riesenfeld, "Gas Purification," Chapter 2 and Chapter 5, Gulf Publishing, 1985.

Leites, I. L., D. A. Sama, and N. Lior, "The Theory and Practice of Energy Saving in the Chemical Industry Some Methods for Reducing Thermodynamic Irreversibility in Chemical Technology Processes," *Energy* (Oxford, United Kingdom), 2003, 28, (1), 55-97.

Ma'mum, S., H. F. Svendsen, K. A. Hoff, and O. Juliussen, "Selection of new absorbents for carbon dioxide capture," presented at the 7th International Conference on Greenhouse Gas Control Technologies, Vancouver, Canada, 2004.

Mimura, T., H. Simayoshi, T. Suda, M. Iijima, and S. Mituoka, "Development of energy saving technology for flue gas carbon dioxide recovery in power plant by chemical absorption method and steam system," *Energy Conversion and Management*, 1997, 38, (Suppl., Proceedings of the Third International Conference on Carbon Dioxide Removal, 1996), S57-S62.

Mitsubishi Heavy Industries, L., "Advanced Solvent to capture CO$_2$ from Flue Gas," 2003.

Okoye, C. I., "Carbon dioxide solubility and absorption rate in monoethanolamine/piperazine/water," M.S. Thesis, The University of Texas at Austin, Austin, 2005.

Oyenekan, B. A. and G. T. Rochelle, "Energy Performance of Stripper Configurations for CO$_2$ Capture by Aqueous Amines," *Ind. Eng. Chem. Res.*, 2006, 45, (8), 2457-64.

Oyenekan, B. A. and G. T. Rochelle, "Modeling of Innovative Stripper Concepts," presented at the 8th International Post Combustion CO$_2$ Capture Network Meeting, Austin, Tex., USA, 2005.

Polasek, J. C., J. A. Bullin, and S. T. Donnelly, "Alternative Flow Schemes to Reduce Capital and Operating Costs of Amine Sweetening Units," *Energy Processing/Canada*, 1982, 74, (5), 45-50.

Posey, M. L., K. G. Tapperson, and G. T. Rochelle, G. T., "A simple model for prediction of acid gas solubilities in alkanolamines," *Gas. Sep. Purif*, 1996, 10, (3), 181-186.

Rochelle, G. T., "Innovative Stripper Configurations to Reduce the Energy Cost of CO$_2$ Capture," presented at the Second Annual Carbon Sequestration Conference, Alexandria, Va., 2003; Alexandria, Va., 2003.

Sartori, G., W. S. Ho, D. W. Savage, G. R. Chludzinski, and S. Wiechert, "Sterically Hindered Amines for Acid-Gas Absorption," *Separation and Purification Methods*, 1987, 16, (2), 171-200.

Sartori, G. and D. W. Savage, "Sterically hindered amines for carbon dioxide removal from gases," *Industrial & Engineering Chemistry Fundamentals*, 1983, 22, (2), 239-49.

Shimizu, S., M. Onoda, and K. Goto, "Novel absorbents for CO$_2$-capture from gas stream," presented at the 8th International Conference on Greenhouse Gas Control Technologies, Trondheim, Norway, 2006.

Versteeg, G. F., P. S. Kumar, J. A. Hogendoorn, and P. H. M. Feron, "New absorption liquids for the removal of CO$_2$ from dilute gas streams using membrane contactors," *Chemical Engineering Science*, 2002, 57, (9), 1639-1651.

Yagi, Y., T. Mimura, T. Yonekawa, and R. Yoshiyama, "Development and improvement of CO2-capture system," presented at the 8th International Conference on Greenhouse Gas Control Technologies, Trondheim, Norway, 2006.

We claim:

1. A method for removing an acid gas from a gaseous stream using absorption and stripping equipment, comprising:
    (a) contacting the gaseous stream with a solvent in the absorption equipment such that a rich solvent stream exits the absorption equipment;
    (b) feeding a portion of the rich solvent stream to each of n strippers having stripping zones, wherein n is a fixed integer greater than 1 and wherein the j-th stripper is operated at a higher pressure than and has one less stripping zone than the (j+1)-th stripper, wherein j is a variable integer greater than or equal to 1 but less than n;
    (c) supplying heat from a distinct, unlinked source to the j-th stripper such that a partially regenerated solvent stream exits from each of the stripping zones and is fed to the (j+1)-th stripper at a point below where the portion of the rich solvent stream is fed to the (j+1)-th stripper, wherein the distinct, unlinked source is an independent source of heat that does not derive its heat from a source supplying heat to one of the other strippers; and
    (d) supplying heat from a distinct, unlinked source to the n-th stripper such that a partially regenerated solvent stream exits from each of the stripping zones and is cross-exchanged with one of the portions of the rich solvent stream that are being fed to the n strippers, wherein the distinct, unlinked source is an independent source of heat that does not derive its heat from a source supplying heat to one of the other strippers;
    wherein an acid gas is removed from the gaseous stream.

2. The method of claim 1, wherein each partially regenerated solvent stream fed to the (j+1)-th stripper is fed at a point above where any other partially regenerated solvent streams that contain less acid gas are fed to the (j+1)-th stripper.

3. The method of claim 1, wherein the partially regenerated solvent stream exiting from each of the stripping zones contains substantially all of the solvent that entered the stripping zone.

4. The method of claim 1, wherein the partially regenerated solvent stream exiting from each of the stripping zones contains less than substantially all of the solvent that entered the stripping zone.

5. The method of claim 1, wherein one or more of the following parameters are selected such that the total energy required by the strippers to achieve a desired percentage of acid gas removal from the gaseous stream is minimized:
    (a) the operating pressures of the strippers;
    (b) the relative sizes of the portions of the rich solvent stream that are fed to the strippers;
    (c) the temperature differences on the hot side of the cross-exchanges; and
    (d) the type of solvent.

6. The method of claim 5, wherein the type of solvent is selected from the group consisting of: monoethanolamine, promoted monoethanolamine, promoted potassium carbonate, promoted tertiary amines, and hindered amines.

7. The method of claim 6, wherein the type of solvent selected is methyldiethanolamine promoted by piperazine.

8. The method of claim 6, wherein the type of solvent selected is monoethanolamine promoted by piperazine.

9. The method of claim 6, wherein the type of solvent selected is monoethanolamine.

10. The method of claim 6, wherein the type of solvent selected is a hindered amine.

11. The method of claim 1, wherein the distinct, unlinked heat sources all provide steam at the same temperature to the n strippers.

12. The method of claim 1, wherein n equals 2.

13. The method of claim 12, wherein the ratio of the operating pressure of the first stripper to the operating pressure of the second stripper is about 1.1 to about 5.

14. The method of claim 13, wherein the operating pressure of the first stripper is about 295 kPa and the operating pressure of the second stripper is about 160 kPa.

15. The method of claim 13, wherein the operating pressure of the first stripper is about 45 kPa and the operating pressure of the second stripper is about 30 kPa.

16. The method of claim 12, wherein the size of the portion of the rich solvent stream that is fed to the second stripper is about 10% to about 90%, by mass, of the size of the portion of the rich solvent stream that is fed to the first stripper.

17. The method of claim 16, wherein the size of the portion of the rich solvent stream that is fed to the second stripper is about 25% to about 50%, by mass, of the size of the portion of the rich solvent stream that is fed to the first stripper.

18. The method of claim 1, wherein n equals 3.

19. An apparatus for removing an acid gas from a gaseous stream, comprising n strippers having stripping zones, wherein n is a fixed integer greater than 1 and wherein the j-th stripper has one less stripping zone than the (j+1)-th stripper, wherein j is a variable integer greater than or equal to 1 but less than n, and wherein the strippers are configured such that:

(a) each of the n strippers is fed a portion of a rich solvent stream;

(b) supplying heat from a distinct, unlinked source to the j-th stripper results in a partially regenerated solvent stream exiting from each of the stripping zones and being fed to the (j+1)-th stripper at a point below where the portion of the rich solvent stream is fed to the (j+1)-th stripper, wherein the distinct, unlinked source is an independent source of heat that does not derive its heat from a source supplying heat to one of the other strippers;

(c) supplying heat from a distinct, unlinked source to the n-th stripper results in a partially regenerated solvent stream exiting from each of the stripping zones and being cross-exchanged with one of the portions of the rich solvent stream that are being fed to the n strippers, wherein the distinct, unlinked source is an independent source of heat that does not derive its heat from a source supplying heat to one of the other strippers; and (d) the j-th stripper is operated at a higher pressure than the (j+1)-th stripper.

20. The apparatus of claim 19, wherein the strippers are further configured such that each partially regenerated solvent stream fed to the (j+1)-th stripper is fed at a point above where any other partially regenerated solvent streams that contain less acid gas are fed to the (j+1)-th stripper.

21. The apparatus of claim 19, wherein n equals 2.

22. The apparatus of claim 19, wherein n equals 3.

23. The apparatus of claim 19, further comprising a distinct, unlinked heat source for each of the n strippers.

* * * * *